(12) United States Patent
Folk et al.

(10) Patent No.: US 8,684,293 B2
(45) Date of Patent: Apr. 1, 2014

(54) APPARATUS FOR STARTING MOVING ITEMS INTO A PROCESSING MACHINE

(75) Inventors: Michael David Folk, Oregon, OH (US); Brian Samuel Hamby, Athens, TN (US); Jerry Eugene Skelton, Old Fort, TN (US); Randall Clark Bascom, Wauseon, OH (US)

(73) Assignee: Johns Manville, Denver, CO (US)

( * ) Notice: Subject to any disclaimer, the term of this patent is extended or adjusted under 35 U.S.C. 154(b) by 351 days.

(21) Appl. No.: 13/150,679

(22) Filed: Jun. 1, 2011

(65) Prior Publication Data
US 2012/0305687 A1    Dec. 6, 2012

(51) Int. Cl.
*B02C 18/22*    (2006.01)
(52) U.S. Cl.
USPC ............... 241/222; 65/500; 65/533; 241/235; 242/472.8
(58) Field of Classification Search
USPC ............ 241/222, 235, 102; 83/111, 347, 348, 83/673, 913; 65/500, 533, 377, 471, 480; 226/91, 92; 242/157 R, 166, 472.8
See application file for complete search history.

(56) References Cited

U.S. PATENT DOCUMENTS

| | | |
|---|---|---|
| 4,083,279 A | 4/1978 | Wester et al. |
| 4,194,896 A | 3/1980 | Symborski et al. |
| 4,509,702 A | 4/1985 | Reese |
| 4,551,160 A | 11/1985 | Frailey et al. |
| 4,576,621 A | 3/1986 | Chappelear et al. |
| 5,935,289 A | 8/1999 | Arterburn et al. |
| 5,970,837 A | 10/1999 | Arterburn et al. |
| 6,202,449 B1 | 3/2001 | Arterburn et al. |
| 7,252,026 B2 | 8/2007 | Kempski et al. |
| 7,703,362 B2 | 4/2010 | Kempski et al. |

*Primary Examiner* — Mark Rosenbaum
(74) *Attorney, Agent, or Firm* — Robert D. Touslee

(57) ABSTRACT

Apparatus, system and methods of using the apparatus and system to manipulate fiber(s) into a chopper, winder or other fiber(s) processing equipment. By using the apparatus the operator(s) are freed up for pressing duties that will increase productivity and also create a safer workplace. The apparatus supports and constrains slowly or rapidly running fiber(s) and moves through a sequence of movements that reposition the fiber(s) into a path that places the running fiber(s) in the proper location for processing in the chopper, winder or other processing equipment and also places the running fiber(s) into a desired groove or valley on a separator roll or guide.

18 Claims, 22 Drawing Sheets

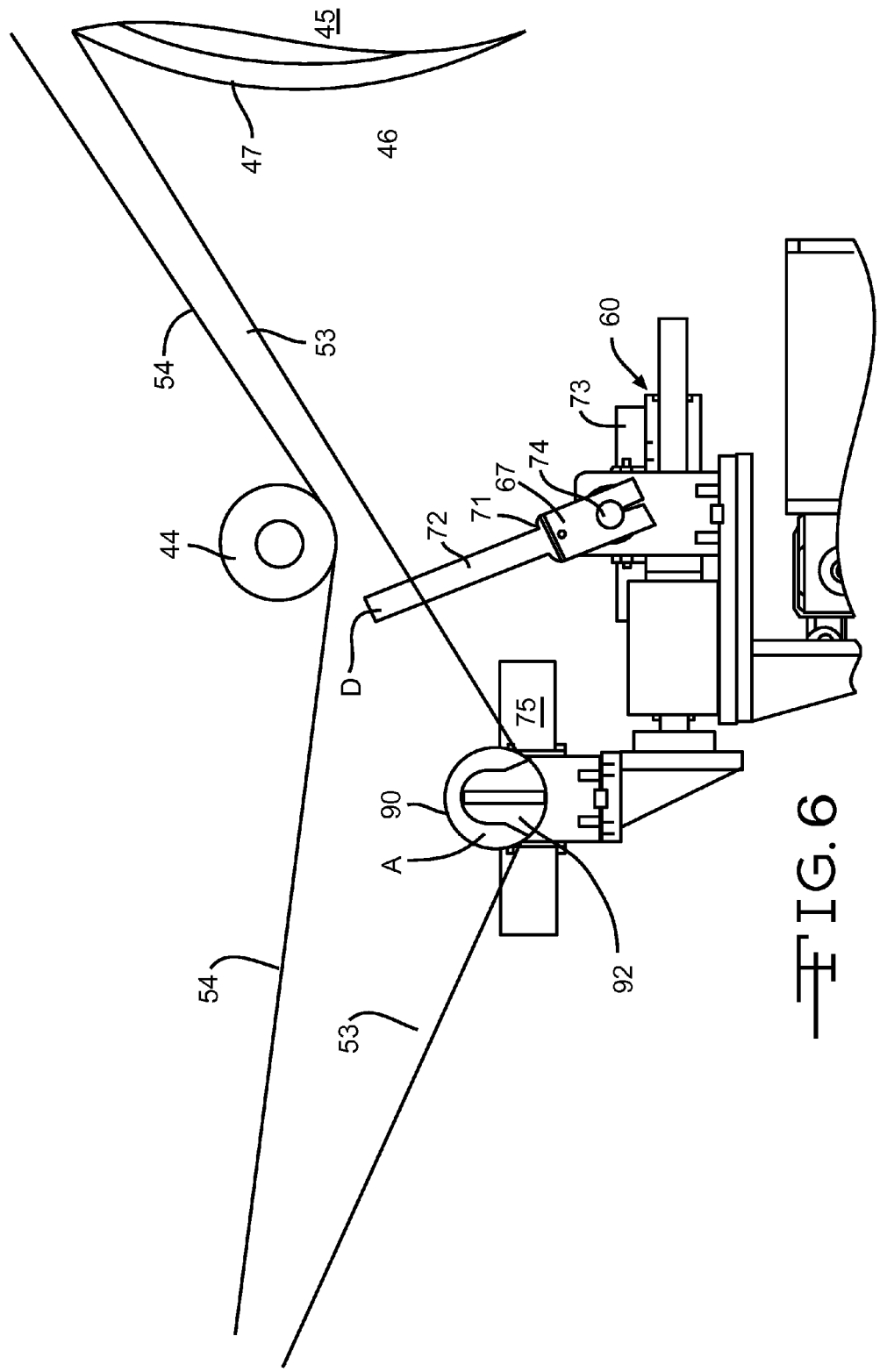

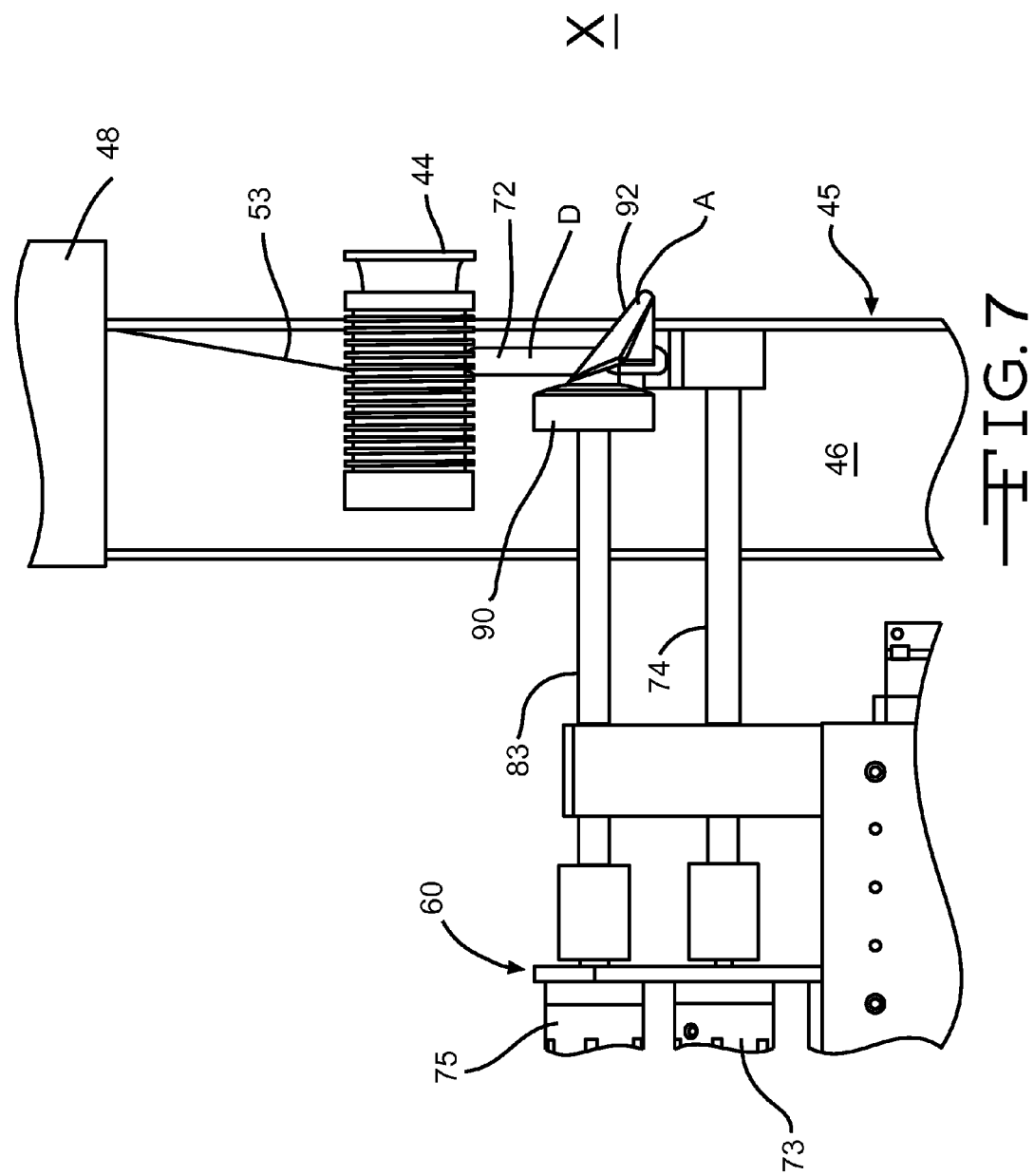

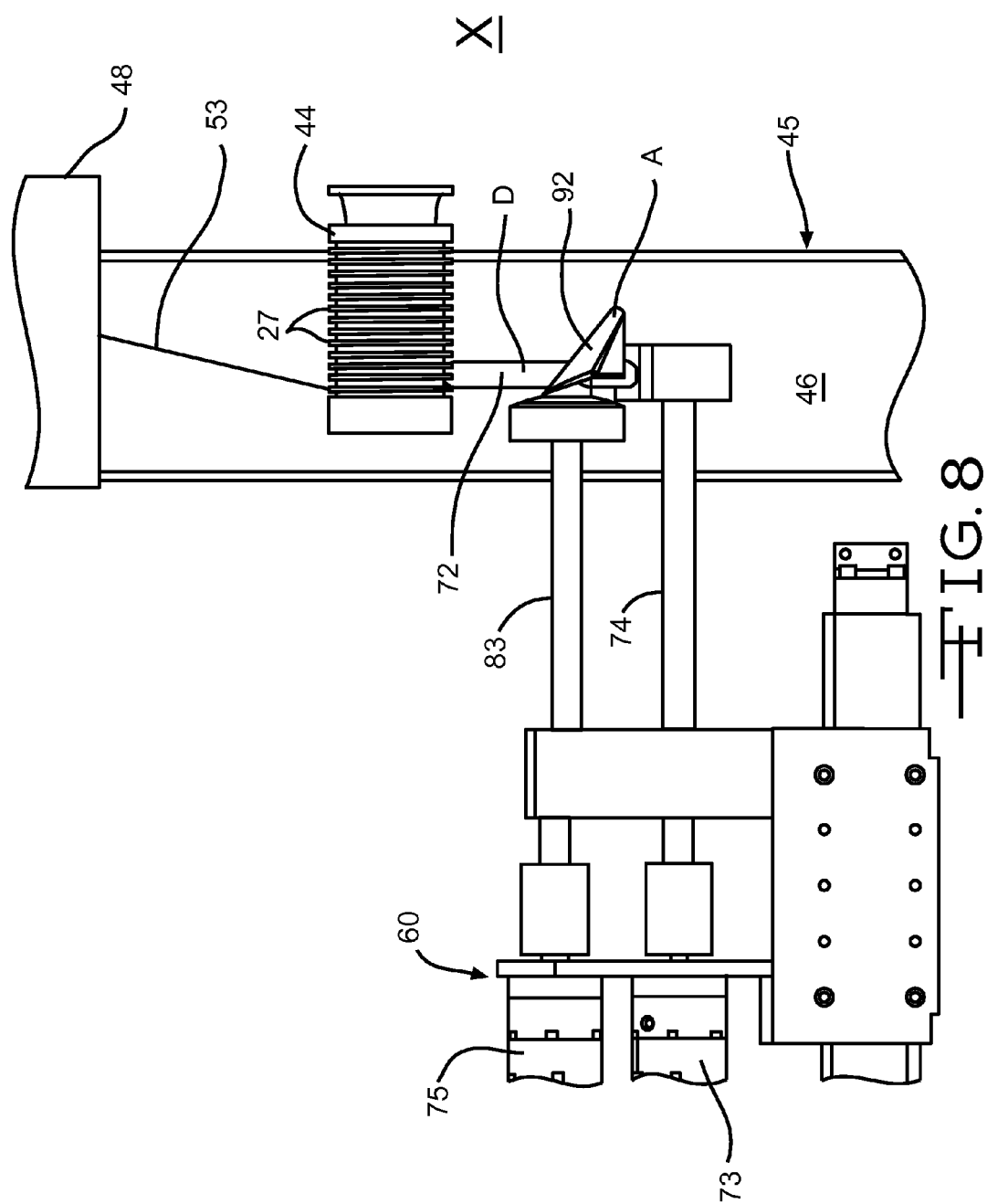

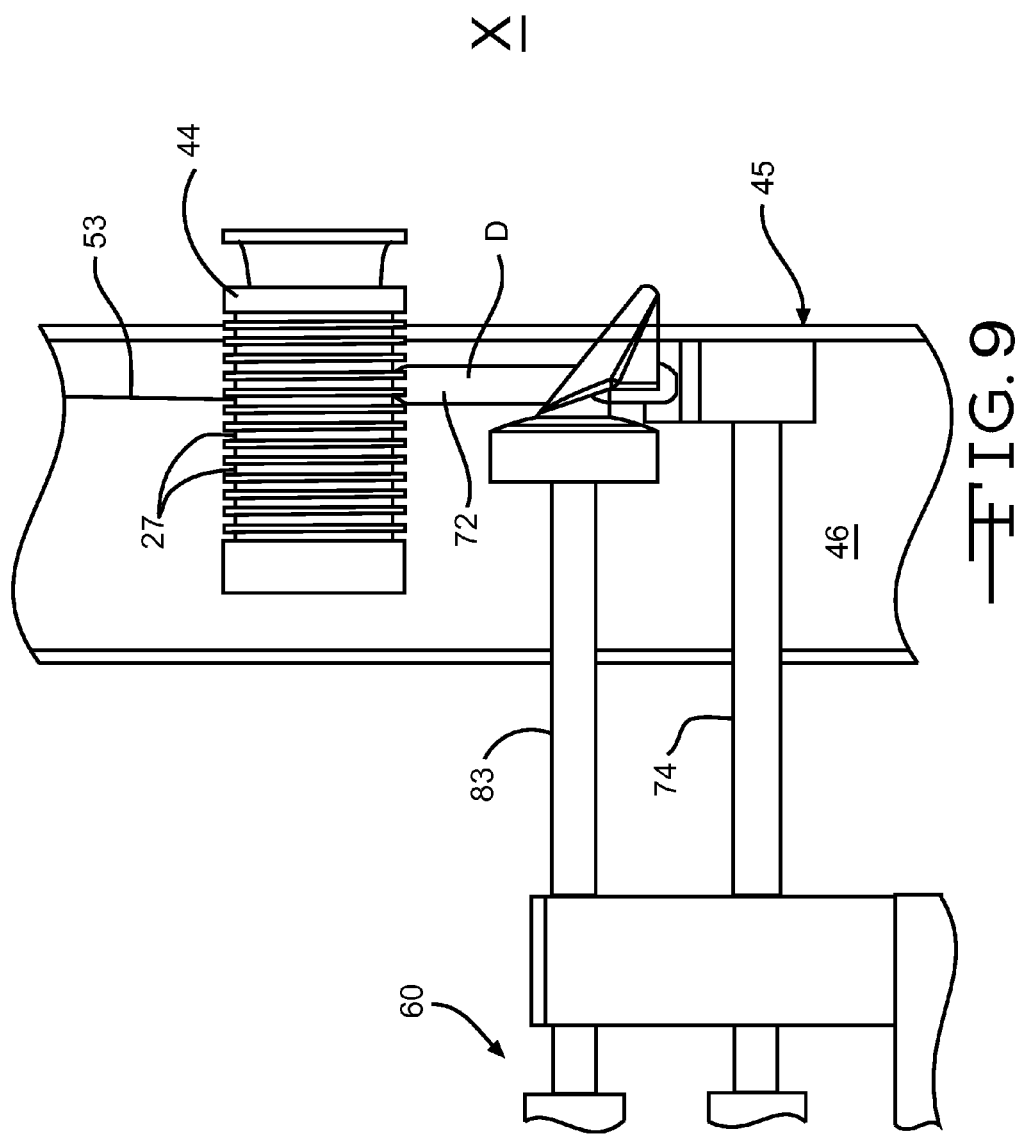

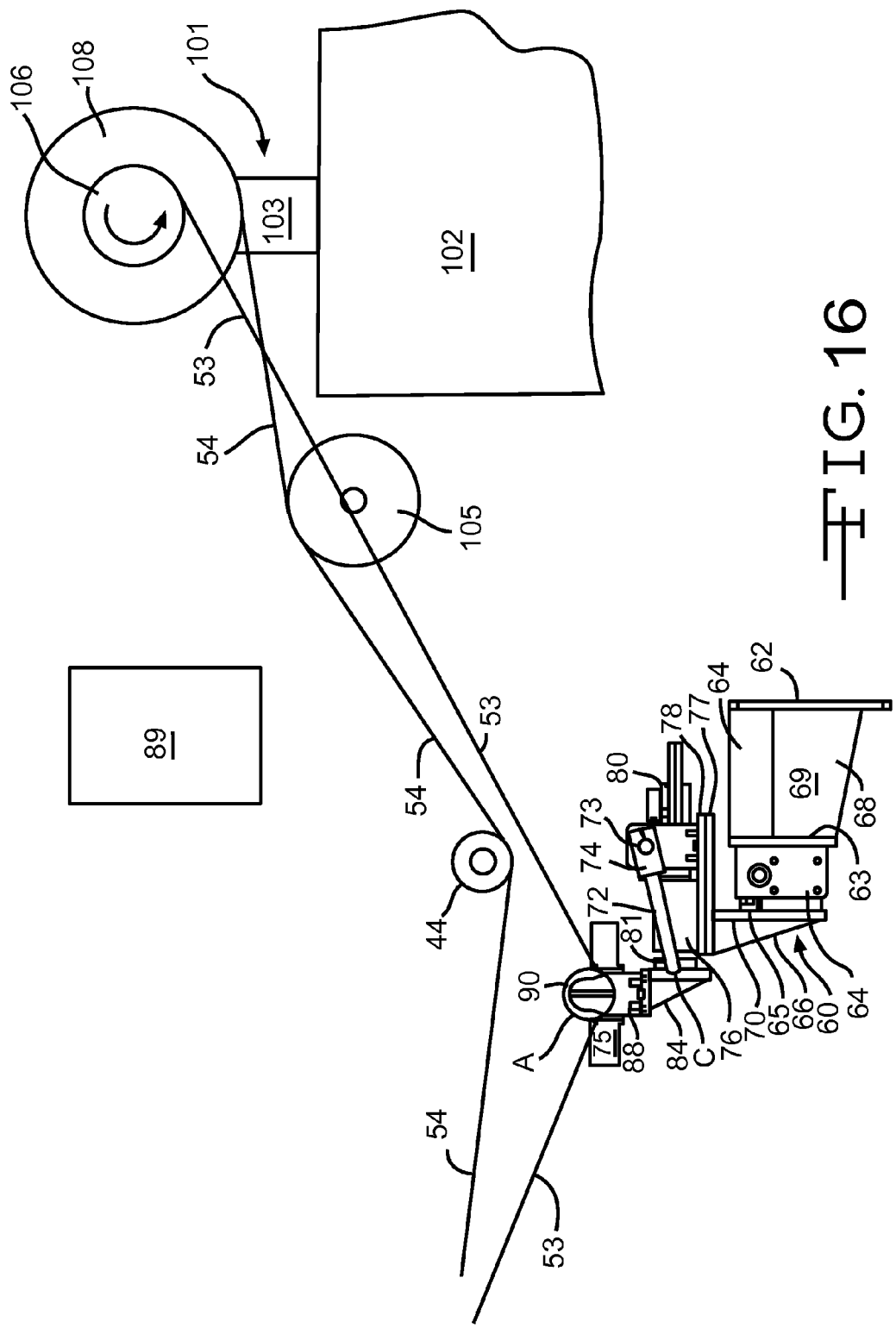

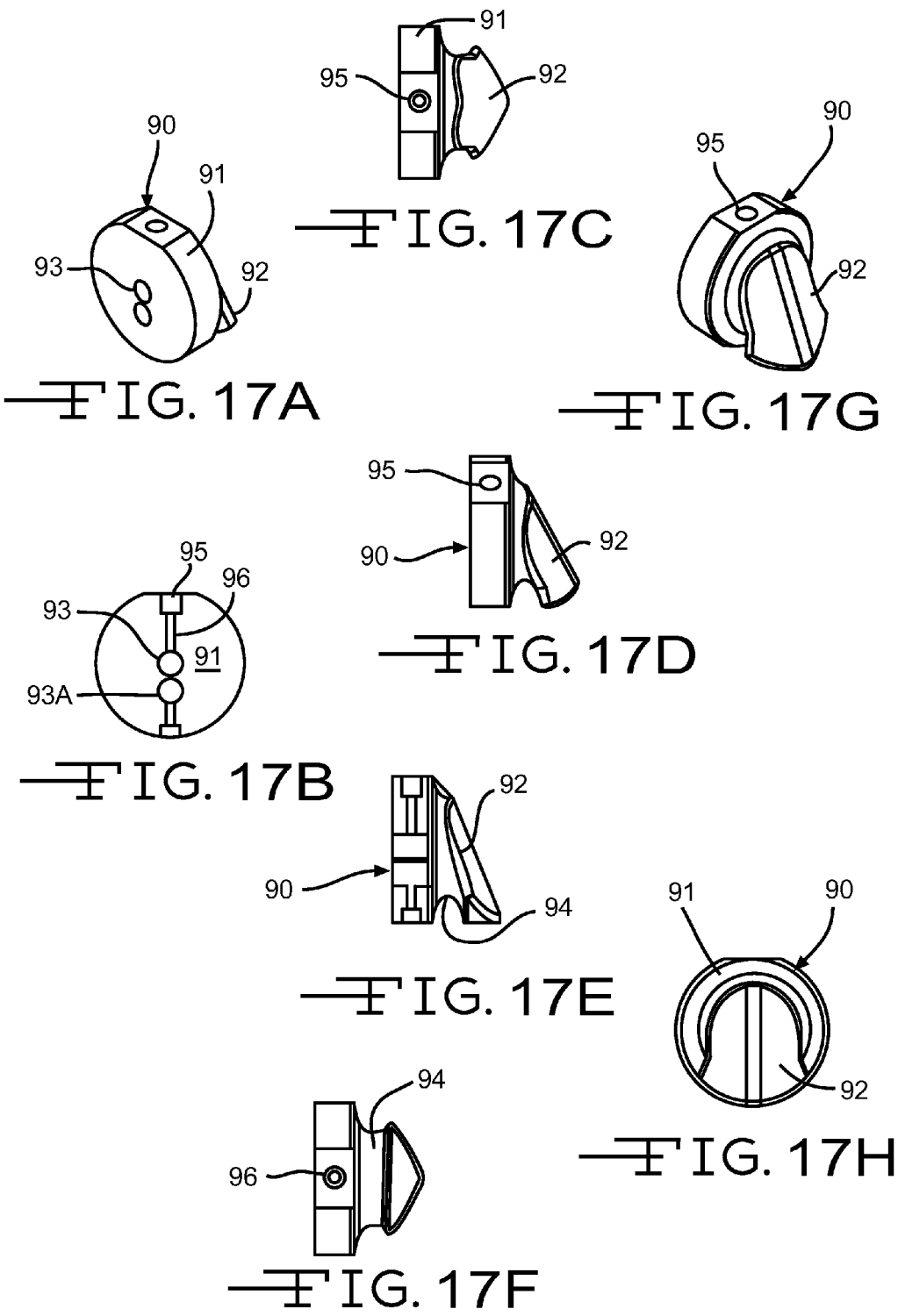

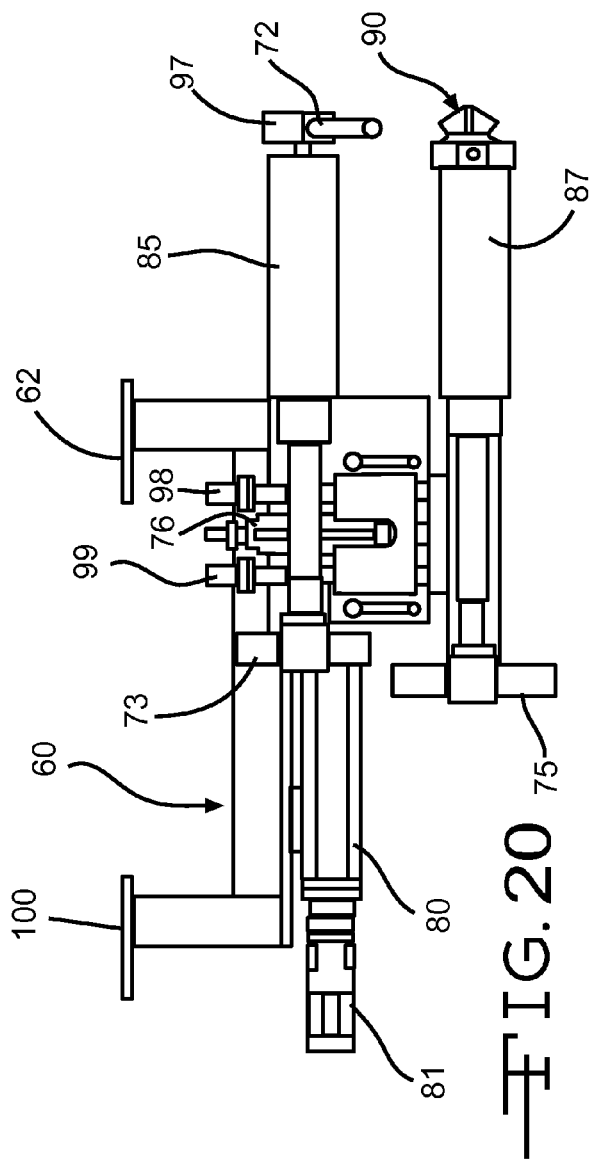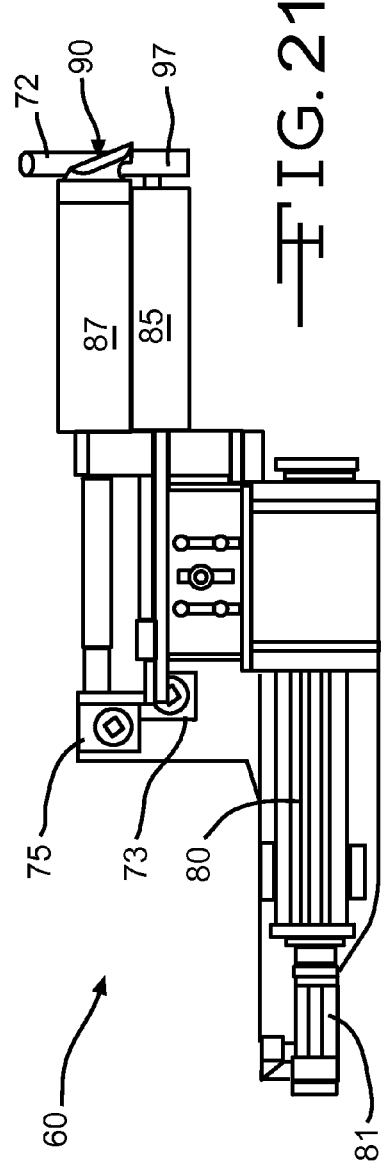

APPARATUS FOR STARTING MOVING ITEMS INTO A PROCESSING MACHINE

This invention involves apparatus and methods useful in the manufacture of continuous fiber and/or continuous fiber strand products including chopped, wound and/or otherwise processed fiber(s) and/or fiber strand(s), and more particularly for starting new fiber(s) and/or new strand(s) of fibers into a puller or chopper or winder, etc. using a mechanical apparatus while other fibers and/or strand(s) of fibers are running into the chopper, puller, winder, etc. and being chopped, pulled or wound, without disturbing those running fiber(s) or strand(s) of fibers.

BACKGROUND

In the manufacture of chopped fibers from continuous fiber(s), such as glass fiber, molten glass is extruded through tips or holes in the bottom of a bushing, forming beads at the end of the tips or the exposed side of the holes. Once beads of the molten glass have formed at the end of the tips or holes and when the beads reach a certain size, the forces of, surface tension, wetting, and viscosity of the molten material holding the bead to the bottom of the tips or holes are overcome by gravity and the beads fall, each bead trailing a continuous, coarse, primary fiber behind which is attached at its other end to the molten glass in the tip or hole from which the bead came. These primary fibers are usually sprayed with a cooling water mist after they move out of the immediate area below the tip plate of the bushing in a known manner. The primary fibers continue to form as the weight of the beads and primary fibers pull down through holes in the floor of the fiber forming room and into a waste system, usually located in a basement or lower level.

Once all of the tips or holes have thus "beaded out", the array of primary fibers from that bushing is ready to be gathered into a fiber bundle, i.e. a strand, and started into a chopper or other device that will pull the strand of fibers at a high speed to attenuate the molten meniscuses forming the fibers very near the tips or holes to a desired fiber diameter and then will also chop, wind or otherwise process the fibers, strand or strands of fibers into a desired product form. Normally, the fibers will also be pulled over or past an applicator that will apply a coating of chemical sizing onto the wet fibers prior to chopping in a known manner.

After a bushing has been in service a few weeks or months, the tips get out of alignment with the cooling means and often a few tips will have a lower molten glass flow rate than the other tips. To accelerate the bead down time of these tips the operator will move the array of primary fibers back and forth to attach the slow beads to primary fibers and pull them down to get a primary fiber from all tips and a strand ready to start. Until the primary fibers are started into a puller, chopper, winder, etc., they usually continue to move and fall into a scrap pit or area beneath the floor of the fiber forming room.

For a number of reasons, fibers tend to break all too frequently, usually near the end of the tips in the bushings. Particularly with E type glass, when one fiber breaks it is most always only a matter of a minute or a few minutes until the entire array of fibers from the bushing is broken out and then generating primary fibers scrap. Even in cases where broken fibers do not form beads or break out the remainder of the bushing, by design, it is nevertheless prudent to break out the entire bushing and restart it after a small number of fibers have broken to maximize efficiency and to reduce variation in the product being produced.

The portion of the continuous fiber making process of starting a strand of fibers from all of the tips of a bushing into choppers or other processing equipment is often done by hand and is labor intensive. It also can cause minor injuries to the hands and is usually abrasive to the hands. Thus, it is desirable to enhance this procedure by making it easier and more effective to avoid injuries, hand abrasion, and false starts and to improve productivity thus reducing labor cost and overhead costs by increasing the percentage of time each bushing is producing good chopped fiber products and to reduce raw material and energy costs by reducing primary fiber scrap.

SUMMARY

The present invention comprises apparatus and methods for eliminating these problems existing in the starting of one or more new continuous fibers and one or more new continuous strands of fibers, hereinafter referred to as "fiber(s)", into a chopper, a winder or other fiber(s) processing equipment. The invention includes apparatus for manipulating slow to rapidly moving fiber(s), i.e. for changing the paths of the fiber(s) for starting new fiber(s) into a chopper, a winder or other fiber(s) processing equipment. The winder can be a direct wound winder on which the fiber(s) are wound onto a mandrel, a cake winder in which the fiber(s) are wound onto a thin tube of paper or plastic, a bobbin winder in which the fiber(s) are wound onto a bobbin, spool or other known fiber(s) holder. Most any type of chopper for chopping fiber(s) into short lengths is included as shown in the drawings. Other fiber(s) processing equipment can include fiber(s) coating, blending, twisting, braiding or other treating/processing equipment.

The fiber(s) can be of any material including various types of glass and/or various polymers, co-polymers and/or homo-polymers, and/or natural material, and/or various kinds of ceramics, and/or various kinds of carbon, and/or various metals and any combination thereof. Typically, the diameters of the fibers in the fiber(s) will be in the range of about 5 microns to about 30 microns, but the diameters are not critical to the invention so can be larger or smaller than this range. By continuous fiber(s) is meant fiber(s) having long lengths, typically tens, hundreds and even thousands of feet long, as contrasted with staple fiber that are much shorter. A strand of fibers can contain staple fibers, but they must be twisted to make a continuous strand, such as wool yarn, cotton thread, and like fibrous strands of staple fibers.

The invention comprises an apparatus particularly useful in a process for making continuous fiber products, such as chopped or wound fiber(s), coated fiber(s) or other processed fiber(s). Typically the lengths of the chopped fiber are in the range of about 0.125 to 5 inches long, more typically about 0.25 to about 4 inches long with lengths averaging 1.25, 1, 0.75, 0.5, 0.25 and 0.16 inch(es) being most common. While there are instances where an individual fiber is started into the chopper, it is more typical to use the invention on strands of fibers containing from about 400 to about 6000 or more fibers per strand, particularly about 2400 or more fibers per strand. The fibers need not come from a fiberizing bushing, though that is often the process, but they can be pulled from a wound package, cake or spool or some other type of fiber holding or forming device. The types of wound products that the apparatus of the invention is useful in making include wound cakes, packages, bobbins, etc. of fiber(s) direct roving, manufactured roving (from cakes), cakes, yarn with or without twists, etc. The apparatus of the invention can also be used in conventional processes for making coated fiber(s) products, i.e. in any process where it is necessary for an operator to manipulate the fiber(s) with one or more hands to start new fiber(s) into the process and to adjust the fiber(s) with his hand(s) after the new fiber(s) are started, but not yet in the desired path.

The fiber(s) manipulating apparatus of the invention comprises a rotatable and movable shoe comprising a shaped surface, groove or valley for supporting and constraining the new fiber(s) and the path of slow running, but soon rapidly running, fiber(s), one or more mechanisms for moving the shoe in one or more directions including horizontally, generally horizontally, clockwise and counter-clockwise for rotating the shoe including a rotary actuator, the shape of the shoe being such that when sufficiently rotated, the running fiber(s) will no longer be supported and constrained by the shoe and can move away from the shoe to a different and desired path, a movable and pivoting finger, guide rod, one or more mechanisms for moving the guide rod or finger in one or more directions including horizontally, generally horizontally and pivoting clockwise and pivoting counter-clockwise, a further mechanism for moving the shoe horizontally or generally horizontally in a direction perpendicular and generally perpendicular to the direction the shoe and the finger or guide rod move, and a controller for operating each of the mechanisms. The apparatus of the invention can also comprise, or be used with, a separator guide or roll having one or more fiber(s) grooves thereon and/or an accelerating roll that will accelerate the speed of the slow running fiber(s) up to a rapid speed when the new fiber(s) are laid onto the upper surface of the accelerating roll and a accelerating switch or sensor actuated, or when the new fiber(s) are wound on a rotating mandrel, put into a set of pull rolls or other pulling device.

By supporting and constraining the fiber(s) is meant with respect to a contacting surface of the shoe, with respect to a horizontal or generally horizontal axis of the shoe, while allowing the fiber(s) to run slowly and then rapidly over the contacting surface in a direction perpendicular or generally perpendicular to the horizontal or generally horizontal axis of the shoe, typically being a valley or groove in the material of the shoe and/or in the material of a projection such as a hooknose, curved finger, and the like. By shoe is meant any shape that will accomplish the function of the tapered shoes disclosed herein. By generally horizontal or horizontally is meant within about 10 degrees from the horizontal, by generally perpendicular is meant from about 5 degrees to about 10 degrees from perpendicular and by generally vertical or vertically is meant within about 10 degrees from vertical. By near is meant being within about one inch. By slow or slowly running or moving is meant moving in the direction of the fiber(s) at a rate up to about 200 or 300 feet per minute (ft./min.) and by rapidly moving or running is meant a speed in the range of up to about 200 or 300 ft./min. to 15,000 ft./min or higher, more typically at least 300 or 500 ft./min. to 10,000 ft./min or higher, most typically at least about 400-750 ft./min. to as high as 1000, 1500, 2000, 5000, 10,000, 15,000 ft./min., anywhere in between any of these speeds or even at higher speeds. The fiber or fiber strand, i.e. strand or strands containing many fibers, usually more than 100, 200, 400, 800, 1600, 2,000, 4,000, 6,000 fibers, any number between these numbers and even many more than 6000 fibers, are usually wet, but need not be. Normally the fiber(s) and/or fiber strand(s) move slowly when the operator first places the fiber(s) and/or fiber strand(s) onto the apparatus of the invention and in a short time the fiber(s) and/or fiber strand(s) are accelerated to a much higher speed, i.e. to a speed in the ranges or upper part of the ranges stated above. By slow or slowly running is meant the initial speed of the strand when placed onto the apparatus of the invention, normally in the range of about 50-250 ft./min. or slightly higher (walking speed of an operator).

The fiber or fiber(s), especially when they are glass fiber(s) usually are coated with a wet chemical sizing of any of many well known fiber sizing compositions, usually containing a lubricant to protect the surface of the fiber(s), and optionally a film former and/or a bond enhancing material to enhance the bond to an intended matrix the fibers will be placed in, the sizing chemicals usually dispersed in water or another solvent. By fiber(s) and/or fiber strand(s) is meant one or more fibers, one or more fiber strands, and one or more strands each containing a plurality of fibers, the latter two categories being the same. By fibers is meant to include fiber(s) of any material including glass, a polymer, a co-polymer, a homo-polymer, natural material including cotton, wool, flax, etc., metal, ceramic (other non-organic materials), carbon, ceramet (ceramic-metal mixtures) and any mixtures thereof.

The shoe or tapered shoe can be of many shapes so long as that it functions to hold, without significantly slowing or impeding the slow and rapid movement of the fiber(s), causing significant drag or friction on the moving fiber(s) in some orientations of its rotation and releases the rapidly moving fiber(s) in other orientations of its rotation. By holding or sustaining is meant restraining the path of the rapidly moving fiber(s) within about 0.25 inch on the fiber(s) entry side and the fiber(s) and/or fiber strand(s) exit side of the tapered shoe. Any mechanism for holding and rotating the tapered shoe is suitable, but a rotatable shaft fixed snugly on one end to the shoe and on or near the other end to a servo motor for rotating the tapered shoe is most preferred, less preferred being a shaft snugly attached to the tapered shoe on one end, passing through a rotatable bearing spaced from the tapered shoe for holding the shaft and a servo motor or other mechanism contacting the shaft near or at its other end for rotating the shaft in the desired manner. The rotating mechanism can include one or more pulleys, sprockets, belts, bands or other known drive elements, or a rotatable roller in contact with an outer surface or the shaft or the tapered shoe, the rotatable roller rotated by a drive of some known type, such as a servo motor. The drive or motor turning the generally horizontally mounted shaft can be mounted on a frame of the apparatus, as can the one or more mechanisms moving the finger or guide rod. The guide rod can be any material having reasonable wear resistance, preferably in the form of a hollow or solid rod having a circular cross-section. At least the surface of the finger or guide rod should be of a material that produces a low level of friction with the moving fiber(s) that are in contact with the finger or guide rod.

The invention also includes a system for starting moving fiber(s) into a fiber processing machine such as a chopper, a winder or other known fiber(s) processing machine, the system including the above moving fiber(s) supporting and manipulating apparatus. The chopper can be any chopper machine that can continuously separate the fiber(s) into short lengths, and the winder can be any winder that winds long lengths of the fiber(s) into packages such as roving packages, cakes, bobbins, and the like.

The invention also includes methods of using the apparatus of the invention to manipulate the rapidly moving fiber(s) and/or the fiber strand(s), and methods of manipulating the rapidly moving fiber(s) or the fiber strand(s) into a chopper, winder or other piece of fiber(s) processing equipment. Also, methods of making chopped fiber(s) and of making wound fiber(s) products using the apparatus of the invention are included in the invention. The manipulation, in many embodiments of the invention, comprises placing slow moving fiber(s) onto a surface of a fiber(s) sustaining surface of a fiber(s) shoe, such as a tapered shoe, and onto a rotating roll that will pull and accelerate the fiber(s) to a rapid speed, and using the strand manipulator by first rotating the guide finger to a vertical or generally vertical position with the end of the guide finger in an upper position above the rapidly moving fiber(s), second moving the guide finger, shoe and fiber(s) horizontally or generally horizontally, and perpendicular or generally perpendicular to the direction in which the fiber(s) are moving rapidly, to a location beneath and in alignment with a desired groove in a fiber(s) guide or guide roll, third moving the shoe horizontally or generally horizontally in a direction parallel to the desired groove in the guide or guide roll to raise the rapidly moving fiber(s) vertically, fourth rotate the shoe to release the fiber(s) from the shoe allowing the fiber(s), with the aid of the guide finger or guide rod, to enter the desired groove on the fiber(s) guide or guide roll, returning the shoe and the guide finger or guide rod to their original positions. These methods can include other steps to facilitate feeding the fiber(s) into a fiber(s) chopper, winder or other type of fiber(s) processing equipment.

The above described inventions increases the productivity of the manufacturing operations by reducing operator errors and by freeing up the operators for more timely attention to the bushings operation, starting new fiber(s) and cleaning of the equipment to avoid sizing buildup that cause breakouts. The inventions also provide for better working conditions by being more safe and less abrasive to the hands. Also, importantly, the invention is much easier for a new operator to become proficient in starting new strands as the prior art technique requires considerable time for new operators to develop the manual dexterity necessary to achieve successful starts, requiring two or more tries, wasting precious time while producing scrap until the new operators finally are developed—some never do and have to seek other tasks or a new job.

When the word "about" is used herein it is meant that the amount or condition it modifies can vary some beyond that stated so long as the advantages of the invention are realized. Practically, there is rarely the time or resources available to very precisely determine the limits of all the parameters of one's invention because to do so would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors' disclosure and understanding the inventive concept and embodiments disclosed including the best mode known to the inventor, the inventor and others can, without inventive effort, explore beyond the limits disclosed to determine if the invention is realized beyond those limits and, when embodiments are found to be without any unexpected characteristics, those embodiments are within the meaning of the term "about" as used herein. It is not difficult for the artisan or others to determine whether such an embodiment is either as expected or, because of either a break in the continuity of results or one or more features that are significantly better than reported by the inventor, is surprising and thus an unobvious teaching leading to a further advance in the art.

BRIEF DESCRIPTION OF THE DRAWINGS

FIG. 6 is a partial front view of the apparatus shown in FIG. 5A holding moving new fiber(s) in a first position.

FIG. 7 is a partial plan view of FIG. 5A.

FIG. 8 is a partial plan view showing the moving new fiber(s) in a second position.

FIG. 9 is a partial plan view showing the moving new fiber(s) in a third position.

FIG. 16 is a front view showing the use of the apparatus of the invention in a different fiber(s) processing system and method to make different fiber products.

FIG. 17A is a rear perspective view of a shoe used in the invention to hold the moving new fiber(s).

FIG. 17B is a rear view of the shoe of FIG. 17A.

FIG. 17C is a plan view of the shoe of FIG. 17A.

FIG. 17D is an end view of the shoe of FIG. 17A.

FIG. 17E is an end view of the shoe of FIG. 17A with a portion of the shoe cut away to show its interior.

FIG. 17F is a bottom view of the shoe of FIG. 17A.

FIG. 17G is a front perspective view of the shoe of FIG. 17A

FIG. 17H is a front view of the shoe of FIG. 17A.

FIG. 20 is a plan view of the apparatus shown in FIG. 19.

FIG. 21 is an end view of the apparatus shown in FIGS. 19 and 20.

DETAILED DESCRIPTION OF THE BEST MODE AND SOME EMBODIMENTS

Figure 1:
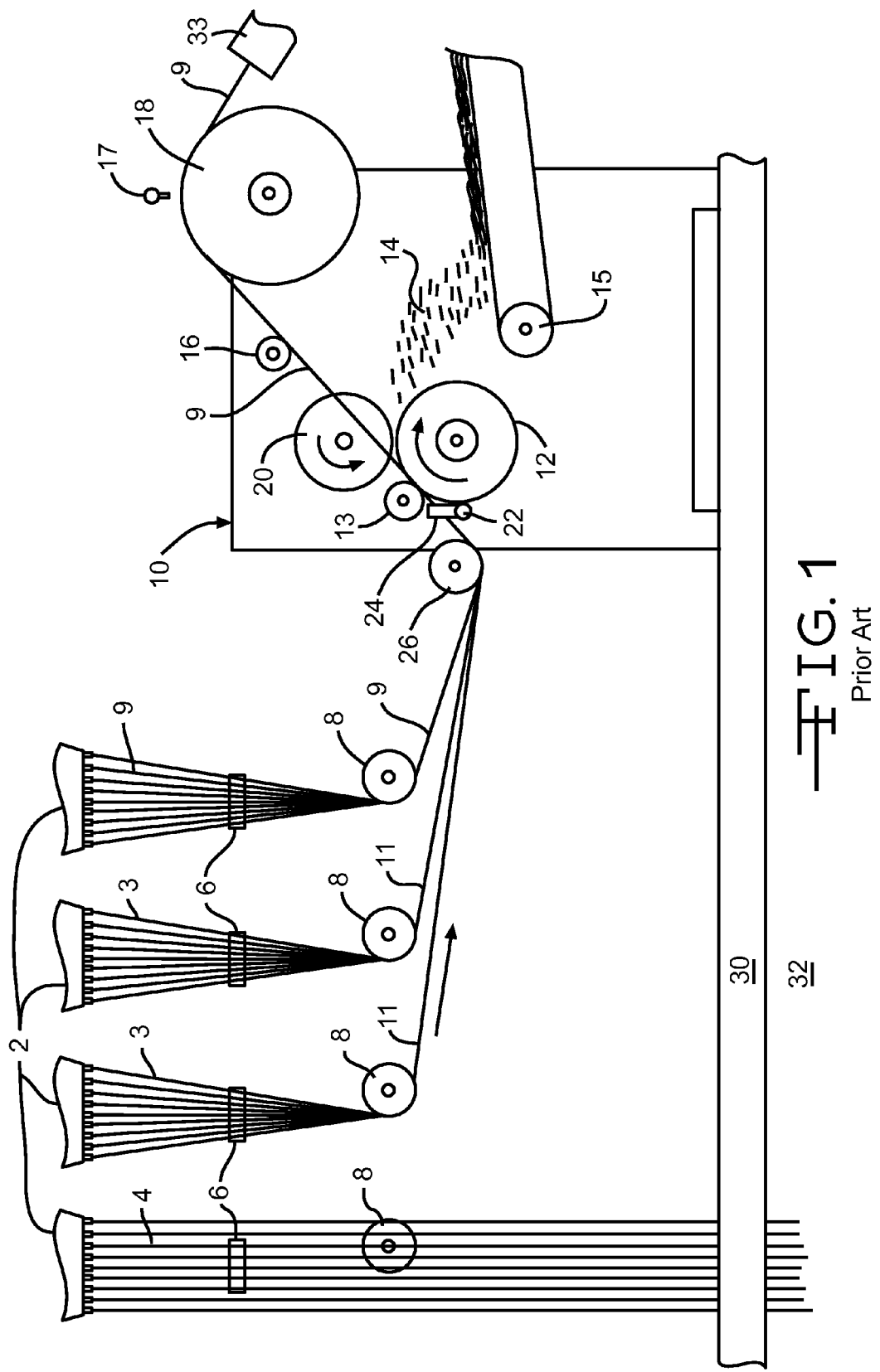
FIG. 1 is a front view of a fiber forming partial leg in a typical prior art glass fiber forming room and showing a prior art fiber(s) chopper.

Typical apparatus and methods used in the industry to make continuous chopped fiber products are disclosed in U.S. Pat. Nos. 4,194,896, 4,576,621, 5,935,289, 5,970,837 and 7,252,026, the disclosures in these patents are hereby incorporated by reference. In a typical method an operator would stand below and in front of a fiber forming bushing to be restarted. If a part of the bushing is still running good fibers, the operator would break out that portion. As soon as all of the tips have beaded out and primary fibers are being generated from all of the tips, the operator gathers the array of fibers together, often several thousand fibers, into a bundle or strand, cuts or breaks the strand to form an end and pulls the fiber strand down such that the fiber array is against or near a sizing applicator, then pulls the strand under a pad wheel or guide with a curved surface located below the bushing and the sizing applicator, and walks the strand, pulling it, towards a puller, such as a chopper or a winder, and feeds the new strand into the pulling mechanism whereby the strand is pulled at the proper attenuation speed and, in the case of a chopper, is moved into a path running to the nip between a rotating idler roll and a counter rotating backup roll, or alternatively, directly into a path towards the nip between the rotating backup roll and a counter rotating blade roll. The idler roll and backup roll pull the strand(s) of fibers and the blade roll and backup roll continuously pull and/or chop the rapidly moving fiber strand(s) into chopped fibers of desired length for use in reinforced plastics, non-woven fiber glass mats, etc. As used herein, the fiber(s) can be a single fiber, a plurality of fibers, a single strand of fibers and/or a two or more strands of fibers as explained above in the Summary.

In a typical operation each operator may have responsibility for 10 to 20 or more bushings and each bushing start may require walking at least 5-40 feet to get the strand to the puller, chopper, winder, or other fiber(s) and/or strand(s) processing equipment, and to walk back to the position or the next position needing attention or restarting. With many bushings typically breaking out (at least 20 fibers broken) at least 0.1-4 or more times per hour, especially when the glass quality varies from normal, the operator either doesn't have time to start each bushing as soon as necessary for most efficient operation, or the operator becomes tired and doesn't get the bushings restarted in a timely manner. This resultant loss of efficiency and the desire to reduce the labor, material, energy and overhead costs in this process makes it desirable to aid the strand restarting process, the most labor intensive portions of these processes, wherever practical. The prior art apparatus and methods of using cause frequent minor injuries and false/aborted strand starts, both resulting in lowered productivity. Therefore, it is very desirable to eliminate these problems. The potential injury and hand abrasion and pinching problems associated with starting new fiber strands has grown more serious with the continued expansion of the number of fibers in the strands because of the development of larger and larger output bushings, each producing thousands of fibers, particularly upwards from about 2400 to more than 6000 fibers.

Figure 2:
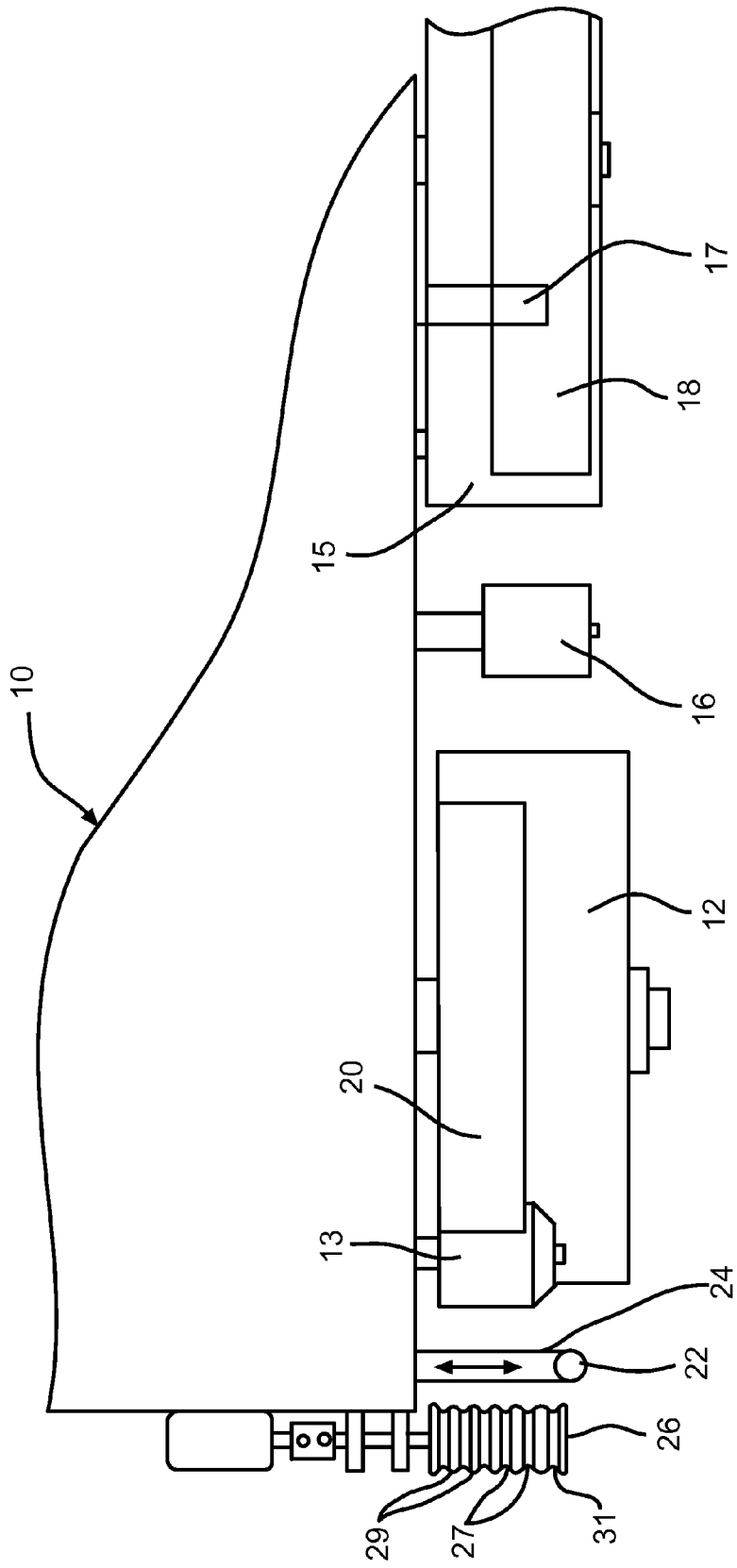
FIG. 2 is a plan view of the prior art system shown in FIG. 1.

FIGS. 1 and 2 show a pertinent portion of a typical prior art system for making continuous fibers and then chopping the fibers, e.g. glass, polymer(s), co-polymer(s), homo-polymer(s) fibers, or fibers of mixtures of two or more such materials. Glass fibers will be used as an example. Molten glass is fed from a furnace and forehearth (not shown) into a plurality of electrically heated fiberizing bushings 2, each bushing having a bottom plate with holes and hollow tips therein through which the molten glass is extruded to form a multitude of coarse, primary fibers 4 which fall downwardly as the glass is extruded through the tips forming an array of primary fibers. Below each bushing and slightly beyond the array of fibers is a sizing applicator 6 for applying a chemical sizing to the fiber(s), usually once the fiber(s) have been started into the chopper. Above each applicator roll 6 and beyond an array of primary fibers 4 or running fiber(s) 3 and new fiber(s) 9 is a turning or pad wheel 8 which is used to turn and guide a new strand of primary fibers 9 or strands of running fiber(s) 11 in a generally horizontal direction towards a multi-grooved fiber(s) guide or guide roll 26 and a chopper 10.

The chopper 10 comprises a frame (not shown) on which is mounted a backup roll or cot 12 having an outer surface typically of polyurethane which is somewhat soft, a pressure roll 13 which cooperates with a backup roll or cot 12 to pull strands of fiber into an engaging nip between a blade roll 20 and the backup roll 12. Blades spaced apart in the blade roll 20 cut the fiber strands into fiber(s) 14 of desired lengths and project them onto a moving conveyor belt 15 which removes the chopped fiber(s) from the area and transports it to a packaging station. As used herein, the fiber(s) can be a single fiber, a plurality of fibers, a single strand of fibers and/or a two or more strands of fibers as explained above in the Summary.

A separator roll 26 can be mounted independently or mounted on the chopper 10 for holding fibers from different bushings apart, normally in grooves 27 (see FIG. 2) so that they are spread fairly evenly across the width of the blades in a blade roll 20. A second guide, in this instance a second guide roll 16, is located above and near the blade roll 20 and near and below a starting or accelerating roll 18. The latter, once a sensor or trip switch 17 is activated as new primary fiber(s) 9 are pulled over the top of the accelerating roll 18, is driven at an accelerating rate up to a desired surface speed such that the surface speed of the accelerating roll 18 equals or is near the desired pulling speed of the running fiber(s) 11 to produce the fibers having a desired diameter based on the molten glass flow rate per tip, and at or near the speed of any other fiber(s) 9 running into the chopper nip between the blade roll 20 and backup roll 12. The fiber(s) 9 passing over the accelerating roll 18 pass into a waste chute as they are larger in diameter than desired until they reach desired pulling speed. The new fiber(s) 9 as they are fed onto the accelerating roll 18 are in transition between coarse primary fibers at the beginning to running fiber(s) 11 after the fiber(s) having the desired speed are moved such that they feed into the nip between the backup roll 12 and the blade roll 20. This chopper 10 has an optional strand-transitioning device located below and to the left of the pressure roll 13 comprising a shaft 22 with a finger 24, in a resting position, on its extreme end. Once the accelerating roll 18 has increased the speed of the new fiber(s) 9 to a desired speed, the finger 24 is moved towards the chopper by retracting the shaft 22 along its axis parallel to the axial center line of the pulling roll 13 and the backup roll 12 by a fluid cylinder (not shown) for the purpose of engaging the fiber(s) 9 and pulling the fiber(s) 9 into the nip between the pressure roll 13 and the backup roll 12 where they become running fiber(s) 11 and are chopped continuously into the desired length. Once the new fiber(s) 9 are pulled into the chopping nip, the finger 24 is moved back to its resting position. However, the step of moving the new fiber(s) into the nip is preferably done by hand as explained herein coupled with moving the running new fiber(s) into the proper groove on a fiber strand separation roll 26.

This chopper is equipped or accompanied with the fiber strand separation roll 26 for holding each fiber strand separate from the other strands and guiding the plurality of strands into the nip of the pressure roll 13 and the backup roll 12 in a desired spaced apart relationship. This first guide or separation roll 26 and chopper 10 is shown in plan view in FIG. 2 and comprises the roll 26 having smooth, rounded valleys 27 on its surface, formed by smooth, rounded ridges 29 between the valleys 27, for the fiber(s) 11 to move through rapidly. The first guide roll 26 can be rigidly mounted on a shaft that is mounted on two or more bearings and very slowly rotated by a small gear drive to prevent the strands from wearing flat spots where they slide over the surface of valleys 27. Multi-grooved guides or guide roll 26 are well known and preferred for use in the invention is a multi-grooved guide roll and assembly like that disclosed in U.S. Pat. No. 7,252,026, the disclosure of which is incorporated herein by reference.

Referring back to FIG. 1, the two bushings 2 in the middle are running fiber(s) 11 into the chopper making chopped fiber and the bushing on the extreme right is running a plurality of new fiber(s) 9 (transitioning fiber(s)) onto the accelerator roll 18 in preparation for being started into the position to run into the nip for chopping. The bushing on the extreme left has broken out, beaded down and is running an array of coarse, primary fibers 4 into a basement or waste hopper 32 (a bushing running in this mode is described as "hanging"). To start this "hanging" bushing into the chopper, the operator will stand facing the array of primary fibers, he will gather the array together into a strand with both hands while letting the array slide through his hands. Once he has a tight strand, the operator will grab the strand in one hand while pulling it down in such a way that the array of primary fibers are pulled against a sizing applicator roll 6 and then pull the strand of primary fibers (fiber(s)) down around the pad wheel 8 and, after breaking the fiber(s) to get a new end, starts walking toward the chopper 10 while gripping the fiber(s) 9 near the new end. As the operator nears the chopper 10, and while continuing to pull the primary fiber(s) 9, the operator guides the primary fiber(s) 9 under the first guide roll 26 into a starting groove 31, and optionally, over the strand transition shaft 22 inside the finger 24, over the backup roll 12 (without touching the strand to the peripheral surface of the backup roll), under the second guide roll 16, actuating the switch or sensor 17 and over the starting wheel 18, pulling the primary fiber(s) 9 onto the surface of the top portion of the now rotating accelerating wheel 18. When the fiber(s) make contact with the surface of the top portion of the accelerating wheel 18, this wheel will take over pulling and accelerating the primary fiber(s) 9, so the operator releases the primary fiber(s) 9 just above the top surface of the wheel 18, or sometimes as soon as they contact the wheel. The fiber(s) 9 coming over the accelerating wheel 18 are projected by the accelerating wheel 18 into a waste chute 33 that directs the fiber(s) 9 to the scrap basement 32 or hopper. After a few seconds the fiber(s) 9 will be up to or near desired running speed at which time the fiber(s) 9 can be moved into the nip between the blade roll 20 and the backup roll 12 manually as described herein, or optionally mechanically as shaft 22 is automatically retracted moving finger 24 towards the chopper frame engaging the rapidly moving fiber(s) 9, pulling them into the nip between the backup roll 12 and the pressure roll 13 at which time they become rapidly moving fiber(s) 11. At that time the pressure roll 13 takes over from accelerating roll 18, the strand is cut by a cutter roll 20, and the remainder of the fiber(s) 9 is thrown into the waste chute by roll 18. Shaft 22 and finger 24 is then automatically moved back to its starting position, roll 18 is shut down and the system is ready to start the next fiber(s) 9 while the running fiber(s) 11 continue to be chopped.

The purpose of this start up procedure is to get the fiber(s) 9 up to proper pulling speed, thus producing the desired fiber diameter, before the new fibers 9 are fed to the cutter or blade roll 20. The chopped fiber(s) 14 are useful making non-woven mats for roofing and other products, for reinforcement in various organic and inorganic matrices such as nylon, polyurethane, gypsum, cement, rubber, metals and many other materials. This prior art chopper shown in FIGS. 1 and 2, modified to remove the cylinder rod 22 and starting finger 24, is used in with the description of the fiber(s) manipulation invention below.

FIGS. 3A, 3B, 4A and 4B show four other prior art choppers for useful with the invention, the apparatus of the invention positioned in relation with the guide roll 26A, 26B, 26C and 26D respectively on each of these choppers in the same manner as is shown in the figures described below. The apparatus and method of the invention produces the same advantages and eliminates or reduces the same problems as on the chopper shown in FIGS. 1 and 2 above. In the prior art systems shown in FIGS. 1 through 4B and methods of using these choppers, before the operator can walk back to tend the bushings, hanging fibers, or other parts of the job, the operator must first contact the just started, now rapidly moving, fiber(s) 11 with his palm or thumb and push the just started rapidly moving fiber(s) 11 down out of the starting groove 31 in the guide roll 26 and move the rapidly moving fiber(s) 11 to an appropriate empty running groove 27. It is this act that sometimes causes injury from loose fibers, pinching by the guide roll 26, and abrasion of the skin from the rapidly moving fiber(s) 11 rubbing on the skin of the palm, thumb or a finger. The apparatus and method of the invention eliminates this undesirable, but necessary step.

Figure 3A:
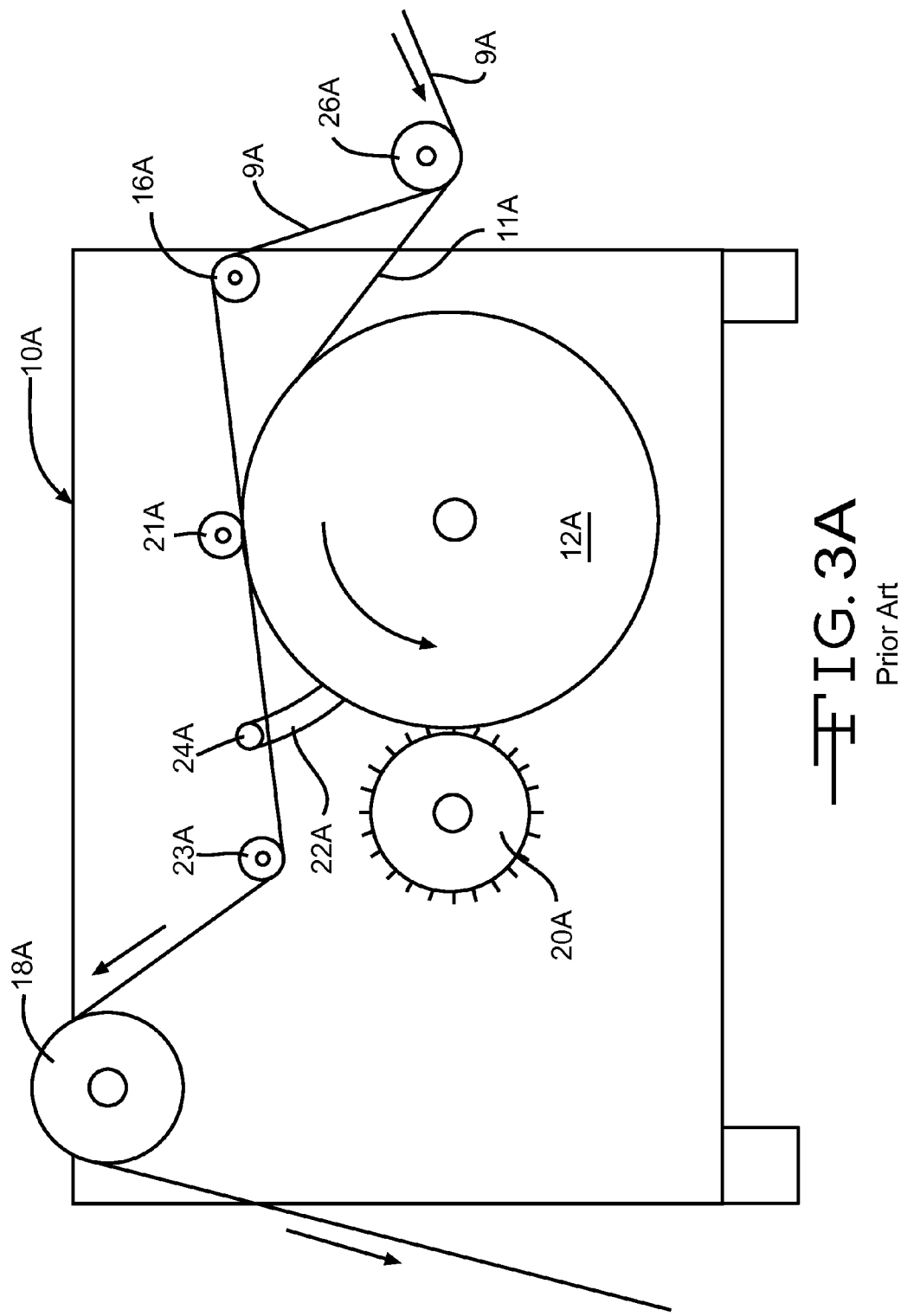
FIG. 3A is a front view of a different prior art chopper useful with the invention

FIG. 3A shows a prior art chopper 10A having most of the same elements as the chopper 10 shown in FIGS. 1 and 2, but differs somewhat in that while the chopper 10 discharges the chopped fibers 14 horizontally, the chopper 10A discharges chopped fibers vertically downward. Chopper 10A comprises backup roll 12A, a blade roll 20A containing spaced apart blades, an accelerator roll 18A, a separator roll 26A located on the fiber(s) feed-in side of the chopper 10A, a guide roll 16A, a second guide roll 21A, a third guide roll 23A, a starting finger 24A and a slot 22A for the starting finger 24A to move through in starting new fiber(s) 9A onto a peripheral surface of the rotating backup roll 12A to start its feeding into the nip between the rotating backup roll 12A and the counter-rotating blade roll 20A to become running fiber(s) 11A. Further details of the operation of this chopper can be found in U.S. Pat. No. 5,970,837, the disclosure hereby incorporated herein by reference.

Figure 3B:
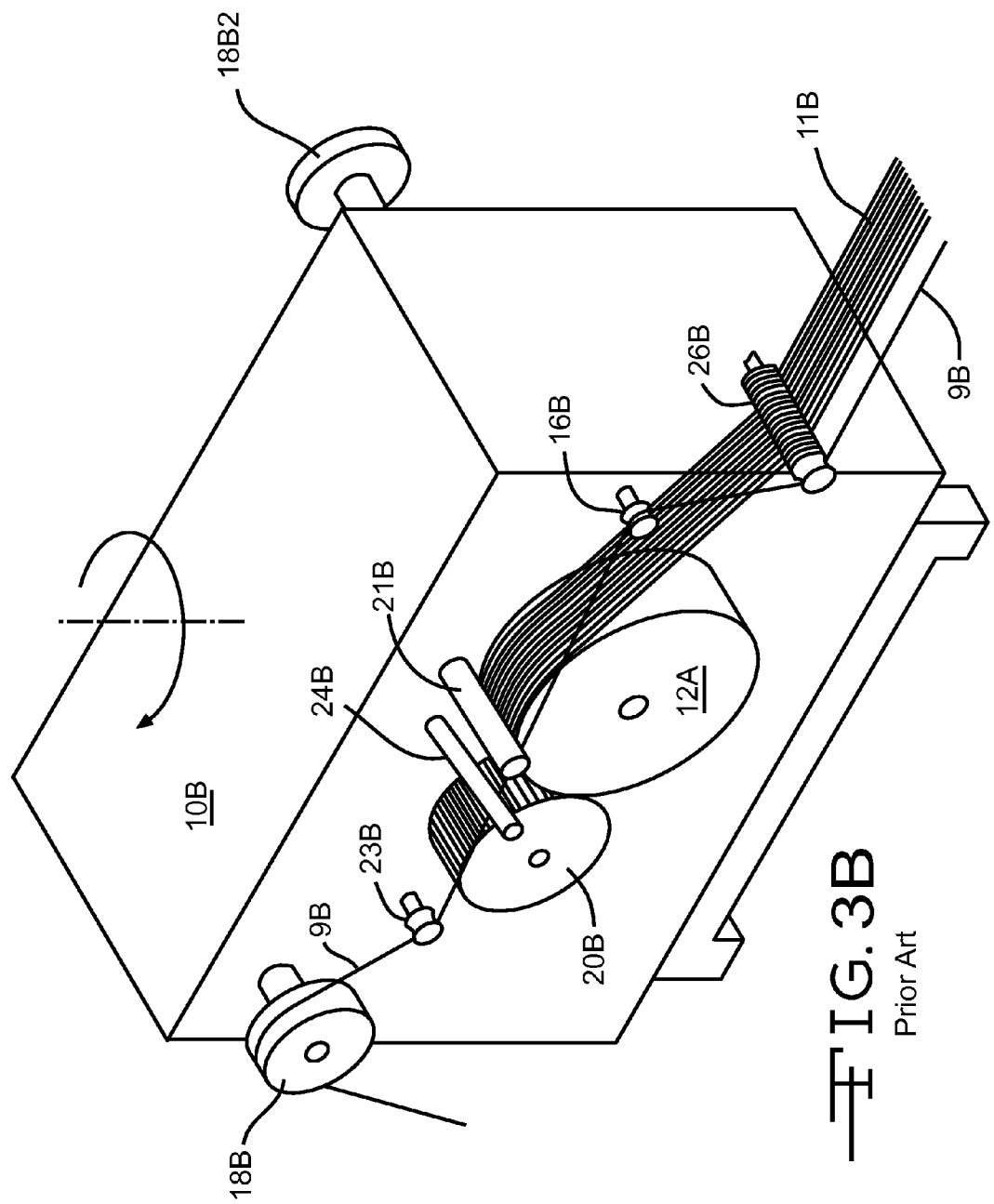
FIG. 3B is a perspective view of another prior art chopper useful with the invention

FIG. 3B shows a prior art chopper 10B having most of the same elements as the chopper 10A shown in FIG. 3A, but differs somewhat in that the chopper 10B pivots around an axis X to bring another side of the chopper into place having the same elements, but having a new backup roll 12B and/or new blades in a blade roll 20B. This pivoting feature is not described here, but it as well as the method of operation is fully described in U.S. Pat. No. 5,970,837 mentioned above. Chopper 10B comprises the backup roll 12B, the blade roll 20B containing spaced apart blades, an accelerator roll 18B, a separator roll 26B located on the fiber(s) feed-in side of the chopper 10B, a guide roll 16B, a second guide roll 21B, a third guide roll 23B, a starting finger 24B and a slot 22B for the starting finger 24B to move through in starting new fiber(s) 9B onto a peripheral surface of the rotating backup roll 12B to start its feeding into the nip between the rotating backup roll 12B and the counter-rotating blade roll 20B to become running fiber(s) 11B.

Figure 4A:
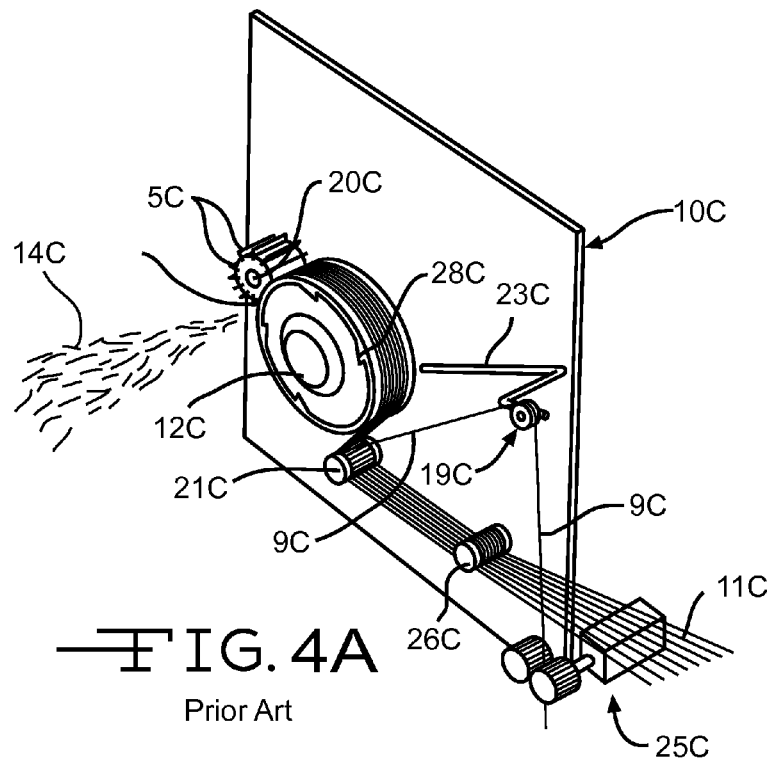
FIG. 4A is a perspective view of still another prior art chopper useful with the invention.

FIG. 4A shows another prior art chopper 10C having some of the same elements of the choppers 10, 10A and 10B described above, but having different elements for starting new fiber(s) 9C into the chopper 10C. Chopper 10C comprises a backup roll 12C, a blade roll 20C containing a plurality of spaced apart blades 5C, a separator roll 26C and a turning roll 21C for pulling running fiber(s) 11C into the chopper 10C and for chopping the running fiber(s) 10C into chopped fiber(s) 14C of desired lengths. The chopper 10C further comprises a pivoting roll 19C mounted on a pivoting arm 23C, a few new fiber(s) grabbers 28C spaced apart around the front periphery of the backup roll 12C and a set of accelerating pull rolls 25C for starting the new fiber(s) 9C into the chopper 10C to become running fiber(s) 11C. This chopper and its operation are fully described in U.S. Pat. Nos.

4,551,160 and 7,703,362, the disclosures of which are hereby incorporated herein by reference.

Figure 4B:
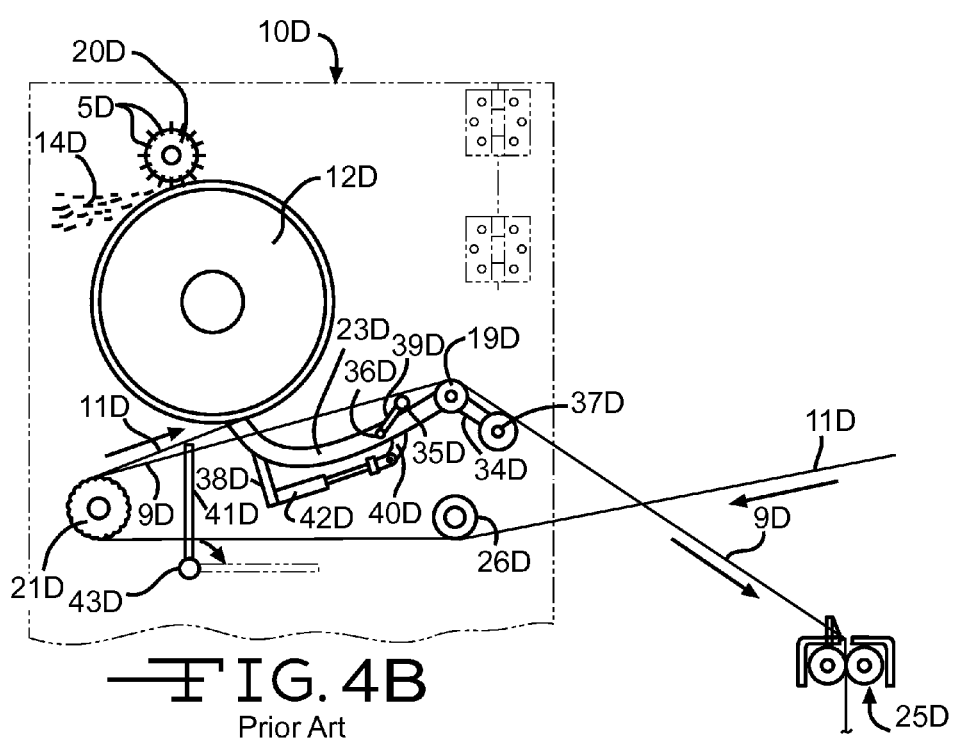
FIG. 4B is a front view of still another prior art chopper useful with the invention.

FIG. 4B shows another prior art chopper 10D, being an improvement of the chopper shown in FIG. 4A and having some of the same elements of the choppers 10, 10A, 10B and 10C described above, but having different elements for starting new fiber(s) 9D into the chopper 10D. Chopper 10D comprises a backup roll 12D, a blade roll 20D containing a plurality of spaced apart blades 5D, a separator roll 26D and a modified turning roll 21D for pulling running fiber(s) 11D into the chopper 10D, for supporting new fiber(s) 9D and for chopping the running fiber(s) 11D into chopped fiber(s) 14D of desired lengths. The chopper 10D further comprises a pivoting roll 19D mounted on a pivoting arm 23D, a an extension roll 37D mounted on a short arm 34D, a press roll 35D mounted on a second arm 39D that pivots on a pivot 36D, a bracket 38D for mounting a fluid cylinder 42D with clevis fastened to a second bracket 40D for moving the pivoting arm 23D, a finger 41D also shown in a second position 43D and a set of accelerating pull rolls 25D for accelerating and starting the new fiber(s) 9D into the chopper 10D to become running fiber(s) 11D. This chopper and its operation are fully described in U.S. Pat. No. 7,703,362 mentioned in the previous paragraph.

Figure 5:
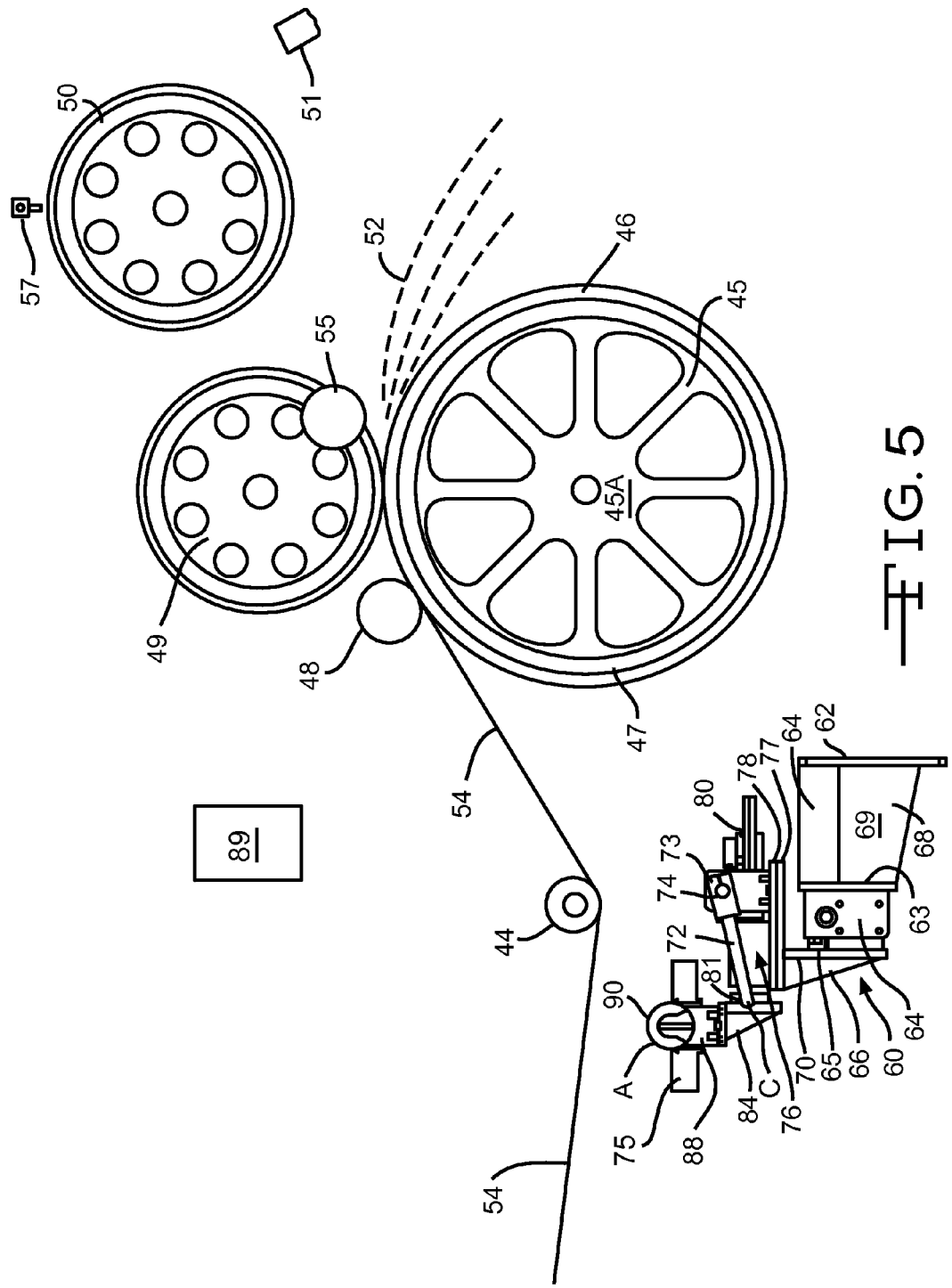
FIG. 5 is a front view of the apparatus of the invention and a partial front view of the chopper shown in FIGS. 1 and 2, but with elements 22 and 24 removed.

FIG. 5 is a front view of the fiber(s) manipulator 60 of the invention located in a new fiber(s) starting position upstream of a fiber chopper (only fiber(s) contacting parts are shown), like the chopper 10 shown in FIGS. 1 and 2, but modified to eliminate the cylinder rod 22 and the starting finger 24 and to relocate the guide roll 16 to a new location as a guide roll 55 to form a different path for starting new fiber(s) coming from a bushing that has been in the hanging mode. Only the chopper fiber(s) contacting elements are shown in FIGS. 5 through 16 and these chopper elements comprise an idler roll 48, a backup roll 45 with an elastomeric, peripheral working layer 46 on a peripheral surface of a wheel 45A of the backup roll 45, and an elastomeric working layer 46 having a front face 47, a blade roll 49, the guide roll 55, an accelerator roll 50, a starting switch and a waste fiber(s) chute 51. The fiber(s) manipulator 60 also works in cooperation with a separator roll 44, like the separator rolls 26, 26A, 26B, 26C and 26D shown in FIGS. 1-4B, the separator roll 44 separating running fiber(s) 54 coming from two or more running bushings (not shown) being chopped to form chopped fibers 52.

The fiber(s) manipulator 60 comprises a frame 69 comprising a vertical or generally vertical mounting plate 62 for mounting to the side of a chopper, a beam or a post, a linear drive such as a fluid cylinder, a rack and pinion drive or preferably a linear actuator 64 (lower portion) and 80 (upper portion), a motor, preferably a servo motor 81 for the linear actuator 64, a pivoting finger or guide rod 72 attached to a rotatable shaft 74, in any known manner including being attached at one end to a rotary actuator 73, or other means to rotate the finger, like a servo motor or a fluid drive motor, a second rotary actuator 75 mounted to the horizontal or generally horizontal plate 77 or to an optional second plate 78 for ease of removal or from the fixed plate 77 or ease of disassembly. An optional reinforcing web 68 can be attached to the mounting plate 62 and to the plate 63, such as with welds, forming a stronger frame or structure 69. Note that in the normal starting position of the fiber(s) manipulator 60, the finger 72 is in the down position C, i.e. rotated down to be horizontal or generally horizontal as shown in FIG. 5 and the position for feeding new fiber(s) 53 to the fiber(s) manipulator 60. The two rotary actuators 73,75 are preferably fluid driven, preferably by compressed air, and are preferably cycled back and forth between two positions to rotate a shoe 90 and the pivoting finger or guide rod 72 by energizing one or two valves (not shown) at the proper time with a signal from a controller. The frame 69 in the embodiment shown in FIGS. 5-15 further comprises a second vertical or generally vertical fixed plate 63 a vertical or generally vertical, movable plate 70 having an optional reinforcing web 66 attached, such as with a weld, thereto and to a horizontal or generally horizontal plate 77, an optional second horizontal or generally horizontal plate 78, a bracket 79 for supporting the front part of the first rotary actuator 73 having the rotatable shaft 74, a second movable vertical or generally vertical moving plate 82 having a reinforcing web 84 attached thereto, such as with weld(s), and to a short horizontal or generally horizontal platform 86, a bracket 88 for supporting a front end of the rotary actuator 75 having a rotatable shaft 83 (FIG. 7) on which the shoe 90 is attached and a controller 89 for controlling the sequence of events, explained below, and timing explained below.

One of ordinary skill in the art can readily select appropriate rotary actuators 73, 75, linear actuators 64 and linear thrusters 76, or functional equivalent different types for these rotary and/or linear drives, and a controller for providing the desired sequence and amount of movements of these drives. The types preferred and shown here follow. The linear actuator is a Tolomatic 0.200 lead 14 inch stroke #B3SD15 BML05 SK14 LMI TS2 YM013001 unit available from the R. M. Hoffman Co. of Sunnyvale, Calif. The linear thruster 76 is a Bimba linear thruster #TE-314-EBIMT1 and the rotary actuators 73, 75, are Bimba #PT-098090-ASMT and/or #PT-098180-A2MT, all available from the Bimba Manufacturing Co. of University Park, Ill. The servo motor 81 is an Allen Bradley servo motor #MPL-B1530U-VJ42AA and the controller 89 used here is a CompactLogix™ controller, both available from Rockwell Automation, Inc. of Milwaukee, Wis. The finger 72 and the shoe 90 can be made of a low friction, good wearing material and preferably is a rod having a circular cross section, preferably about one inch in diameter, this diameter is not critical, and made of Micarta™, a close weave fabric-epoxy composite, or a carbon-graphite composite well known in the art as moving fiber contact parts. For safety purposes, a cut can be made around the finger 72 in a lower portion near where it enters a shaft clamp 67, e.g. see location 71 in FIG. 6, to reduce the diameter of the finger 72 at that location to a dimension in the range of about 0.2 to about 0.4 inch so the finger 72 will break off without injuring the operator or damaging the equipment if something or someone gets in the way of the finger 72.

The preferred fiber(s) manipulating apparatus 60 described above is shown in more detail in FIGS. 20-21 having the same element numbers as described above and having additional features as follows. The preferred fiber(s) manipulating apparatus 60 has an additional safety features including sleeves 85 and 87 covering the shafts 74 for the finger 72 and the shaft holding the shoe 90. The sleeve 85 has the same outside diameter as the outside diameter of the finger 72 holder and shaft 74 clamp 97, thus removing a potential pinch point that could cause injury to an operators hand, and also protecting the otherwise exposed shaft 74 from dust, fiber chemical sizing spray, loose fibers, etc. Likewise, the sleeve 87 has the same outside diameter as the outside diameter of the shoe base 91, thus removing another potential pinch point that could cause injury to an operators hand, and also protecting the otherwise exposed shaft holding the shoe 90 from dust, fiber chemical sizing spray, loose fibers, etc. The FIGS. 19-20 show the servo motor 81 connected to the linear actuator 80 for moving the shoe 90 and the fiber(s) in the groove 94 and the finger 72 towards and away from the operator location X, and also shows an optional second mounting structure 100.

Figure 19:
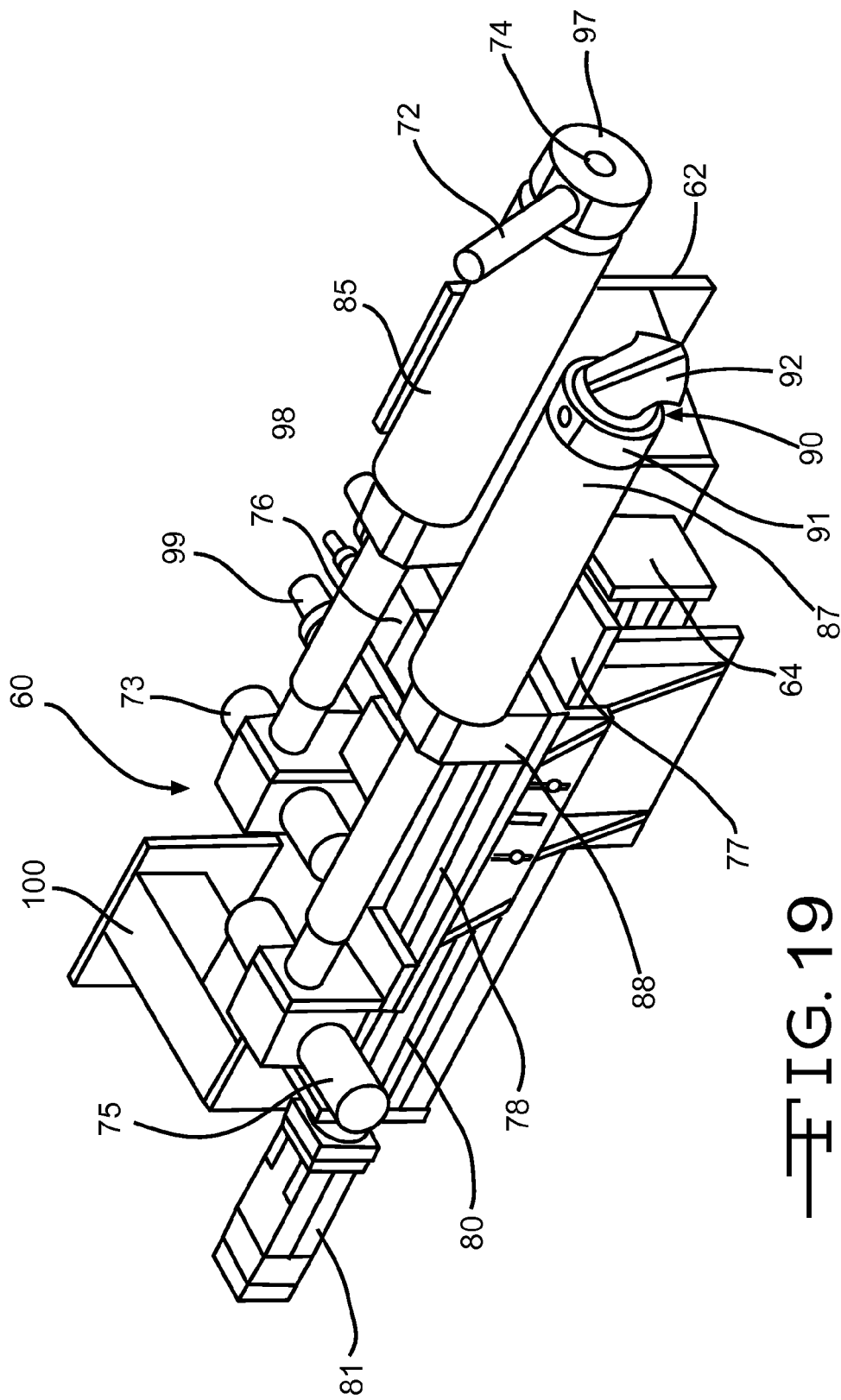
FIG. 19 is a perspective view of a preferred apparatus of the invention.

The horizontal or generally horizontal moving mechanism, the linear thruster 76 in FIGS. 19-21 is provided on each side with guide rods 98 and 99 to control the path of the shoe 90. In this preferred embodiment the rotary actuators 73 and 75 and the linear thruster are powered with compressed air and valves actuated appropriately and in a known manner by the controller 89.

Instead of a servo motor drive, a stepping motor or other type of motor, electric or fluid such as compressed air, oil, etc. powered, can be used with either a linear actuator or a rack and pinion. Also, a fluid cylinder, air, oil or other fluid powered, can be used instead to move the shoe 90 towards or away from the separator roll 44 and backup roll 45. The same options are also available for the linear thruster 76 for moving the shoe 90 and finger 72 towards and away from the operator position X.

Figure 18C:
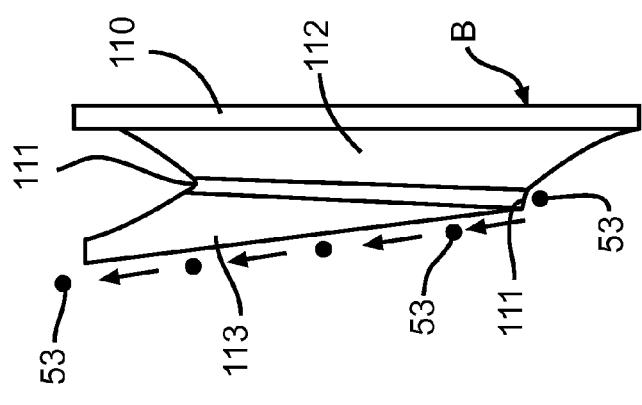
FIG. 18C is a front view of the tapered shoe of FIG. 18A, but in a different and fiber(s) releasing orientation.
Figure 18B:
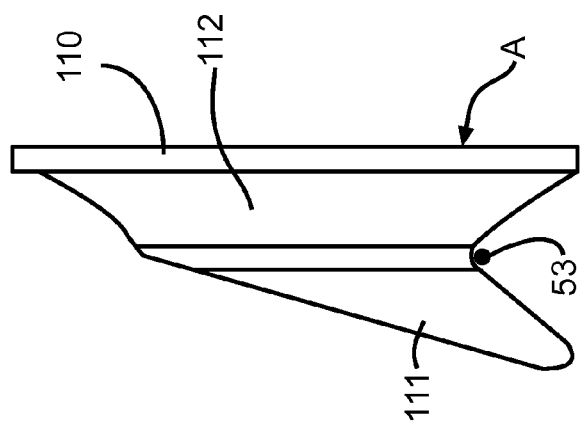
FIG. 18B is an end view of the tapered shoe of FIG. 18A with fiber(s) being supported and constrained.
Figure 18A:
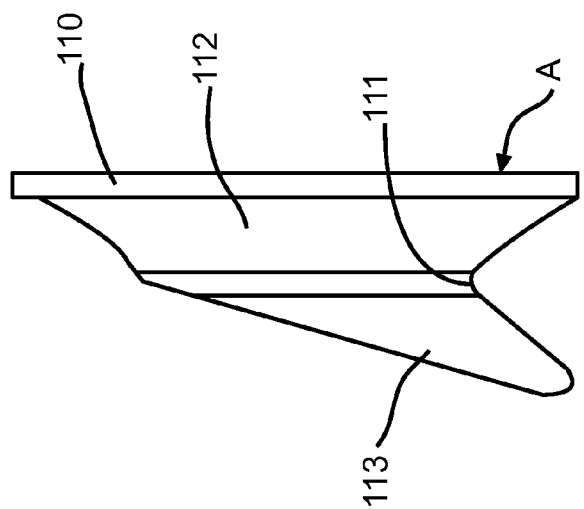
FIG. 18A is an end view of a tapered shoe usable in the invention.

Details of the shape of the shoe 90 is shown in FIGS. 17A through 17H or in FIGS. 18A-18C. Referring to the preferred shoe 90 shown in FIGS. 17A through 17H, the shoe 90 comprises one or more pieces comprising a base 91 having one or more holes 93 therein for mounting to a shaft (not shown) and a hook nose 92 that with the base 91 forms a valley or groove 94 as a supporting and constraining surface. The hooknose 92 has a shape such that in one orientation of the hooknose 92 of the shoe 90, the hooknose 92 supports, and constrains the new fiber(s) in a first path and in another orientation, (17C or F) releases the new fiber(s) to reach a running path. Note that in a normal new fiber(s) starting position A, the show is located lower vertically than the separator roll 44 about 4 to about 8 inches and spaced away from the separator roll in a direction away from the backup roll 45 of the chopper a distance in the range of about 20 to about 30 inches. Also, in the starting position the hooknose 92 of the shoe 90 is in the orientation to support and constrain new fiber(s), in a rounded groove 94, that are started onto the accelerator roll 50, i.e. in the orientation shown in FIGS. 17E, G and H. When the shoe 90 is rotated generally 90 degrees by the rotary actuator 75, as shown in FIG. 17C or 17F, the fiber(s) 53 are released from the groove 94 to find their desired path. The shoe 90 can be made from any good wearing, low friction material, preferably one that is easily shaped, such as Micarta™, preferred, or Nylon® or another plastic or a glass, or a carbon-graphite or graphite or a graphite-metal such as graphite-bronze, including materials known in the art for using in separator rolls, pad wheels, fiber(s) guides.

Any shape of shoe can be used that will in one orientation support and constrain slowly and rapidly running new fiber(s) 53 and in a different orientation will release the rapidly running new fiber(s) 53 to permit them to seek a new path. One example of such an alternative shoe is shown in end views in FIGS. 18A, 18B and 18C. FIG. 18A shows a tapered or modified pulley shaped shoe 110 having a groove 111 for supporting and constraining new fiber(s) 53 and in this figure is in the A position. FIG. 18B is like FIG. 18A, but shows new fiber(s) 53 in the groove 111. The right half 112 of the tapered shoe 110 in FIG. 18A is normal pulley shaped, but the left half 113 is tapered down to allow the new running fiber(s) 53 to release from the groove 111 in the tapered shoe 110 to seek a new path. FIG. 18C shows the tapered shoe 110 in a different, fiber(s) 53 releasing orientation, in the B position that is approximately 180 degrees rotated from the A position and in this B position, shows how the new running fiber(s) 53 move out of the groove 111, there being no constraint due to the tapered side of the left side 113, and up the tapered side of the left side 113 of the tapered shoe 110.

Figure 5A:
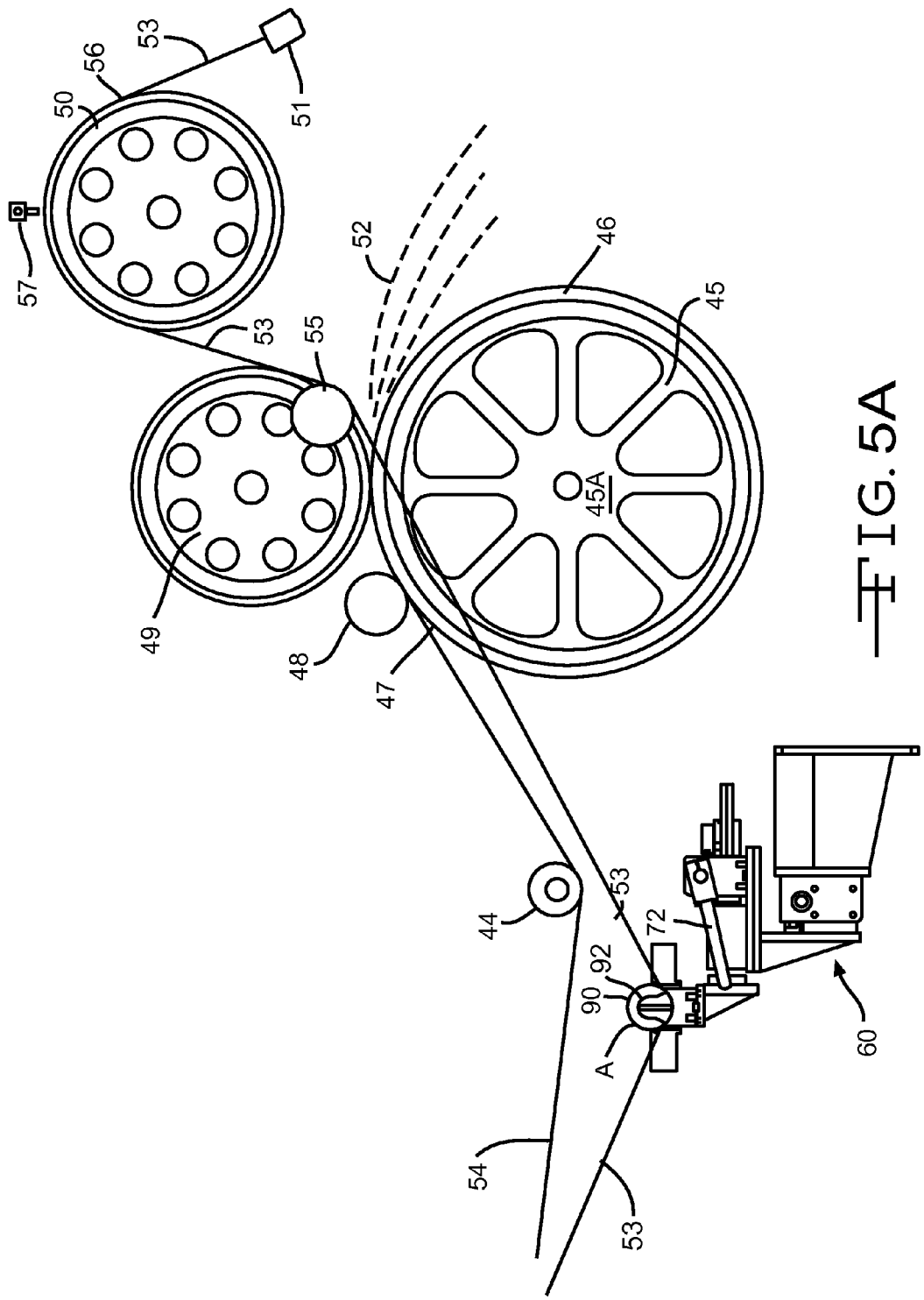
FIG. 5A is a front view similar to FIG. 5, but showing new fiber(s) being started into the chopper using the apparatus of the invention to make chopped fibers.

FIG. 5A shows starting new fiber(s) 53 coming from a bushing that has been in a "hanging mode" and that the operator is starting by pulling the new fiber(s) 53 towards the chopper and placing the fiber(s) 53 under the hooknose 92 of the shoe 90, in the groove 94, onward up under the guide roll 55 and upward and over the accelerating roll 50, while tripping the switch 57 that signals the controller 89 or another controller (not shown) for the chopper and the accelerator roll 50 to accelerate a peripheral surface 56 of the accelerator roll 50 to or near the running speed of the running fiber(s) 54 to accelerate the speed of the fiber(s) 53. Note that in this starting path, the new fiber(s) 53 between the groove 94 in the hooknose 92 on the shoe 90 and the guide roll 55 pass in front of the face of the working layer 46, and a front face of the blade roll 49, in a path vertically below the upper most portion of the working layer 46 and vertically below the lowermost surface of the idler roll 48. Either of the switch 17 being tripped, an adjustable timer in the controller 89 timing out, or a manual operated switch (not shown) on the controller 89, on the chopper controller or elsewhere manually energized by the operator will start the sequence for the fiber(s) manipulator 60 to complete the motions of the fiber(s) necessary to move them onto the peripheral surface of the working surface 46 of the backup roll 45 and into the nip between the working surface 46 and the blade roll 49, and into the desired groove on the separator roll 44 to become running fiber(s) 54 without the operator having to again touch the now rapidly moving fiber(s) 53 or 54.

FIG. 6, a front partial view of the fiber(s) manipulator 60, the separator roll 44 and the backup roll 45, shows the first step in the operating sequence whereby the rotary actuator 73 rotates the shaft 74 to raise the finger 72 to a generally vertical position D for guiding the fiber(s) 53 in subsequent steps. FIG. 7 is an end view looking towards the backup roll 45 of the chopper of with the shoe 90 being in the A position and the finger 72 being in the D position. Only the new fiber(s) 53 are shown in FIG. 7, the running fibers 54 not shown so the path of the new fiber(s) 53 can be better seen. In FIG. 7, X shows the operator's side of the fiber(s) manipulator and separator shoe 44. In FIG. 7, the new fiber(s) 53 are not touching the separator roll 44, but are in a path located vertically beneath the separator roll 44 (see FIGS. 5A and 6), about midway along the grooves 27 of the separator roll 44 and touching or nearly touching a surface of the finger 72 on the side furthest from the operator side X.

FIG. 8 is the next step having as its purpose causing the path of the new fiber(s) 53 to rise up the front of the face 47 of the working layer 46 on the backup roll 45 until it reaches the peripheral surface of the working layer 46 and moves under the idler roll 48, due to its bias in that direction (explained later) and into the nip between the working surface 46 and the blade roll 49 to be chopped into chopped fiber(s) 52. This happens after, preferably as soon as, the moving speed of the new fiber(s) 53 has reached or nearly reached the speed of the running fiber(s) 54. This movement of the new fiber(s) 53 to accomplish this result is done by the fiber(s) manipulator 60 by the moving of the shoe 90 and the finger 72 away from the operator side X, i.e. away from the operator position X, by activation of the linear thruster 76. The finger 72 contacts the new fiber(s) 53, when necessary to move the fiber(s) 53 to the position shown in FIG. 8 while keeping the new fiber(s) 53 in the groove 94 of the hooknose 92.

After the new fiber(s) 53 have completed the step described above in FIG. 8 and are now being chopped into chopped fibers 14, the next step is illustrated in FIG. 9, in plan view. The linear thruster 76 is now activated in a reverse direction to move the shoe 90 with the fiber(s) 53 in the groove 94 towards the operator position X sufficiently until the fiber(s) 53 are in a position beneath an empty or specific groove 27 for that particular new fiber(s) 53. The control of the linear thruster 76 to move the new fiber(s) to precisely to beneath the desired groove 27 on the separator roll 44 can be accomplished in one of a few ways. First, there can be a switch for each of the grooves 27 in the separator roll 44 on the control panel 89 and the operator can trip the proper switch for the bushing position that the new fiber(s) 53 are coming from after starting the new fiber(s) 53 onto the accelerator roll 18, and each switch will control how far the linear actuator 76 will move the shoe 90 and groove 94 towards the operator position X. Alternatively, a breakout detector at each bushing 2 position on the leg of bushings 2, a conventional sensor for detecting when a bushing breaks out and when it is again being pulled at the desired speed, can signal the controller 89 which bushing 2 the new fiber(s) 53 are coming from, freeing the operator from having to trip the correct switch. This latter alternative saves operator time and reduces operator errors. A further alternative is to locate a sensor on each of the pad wheels 8 that would signal the control panel 89 which bushing position is just now being started by the new fiber(s) 53 beginning to turn the pad wheel 8 below that bushing. There are other alternatives as one of ordinary skill will readily figure out, but the preferred alternative is that which is the most simple, least costly and most error and trouble free.

Figure 10:
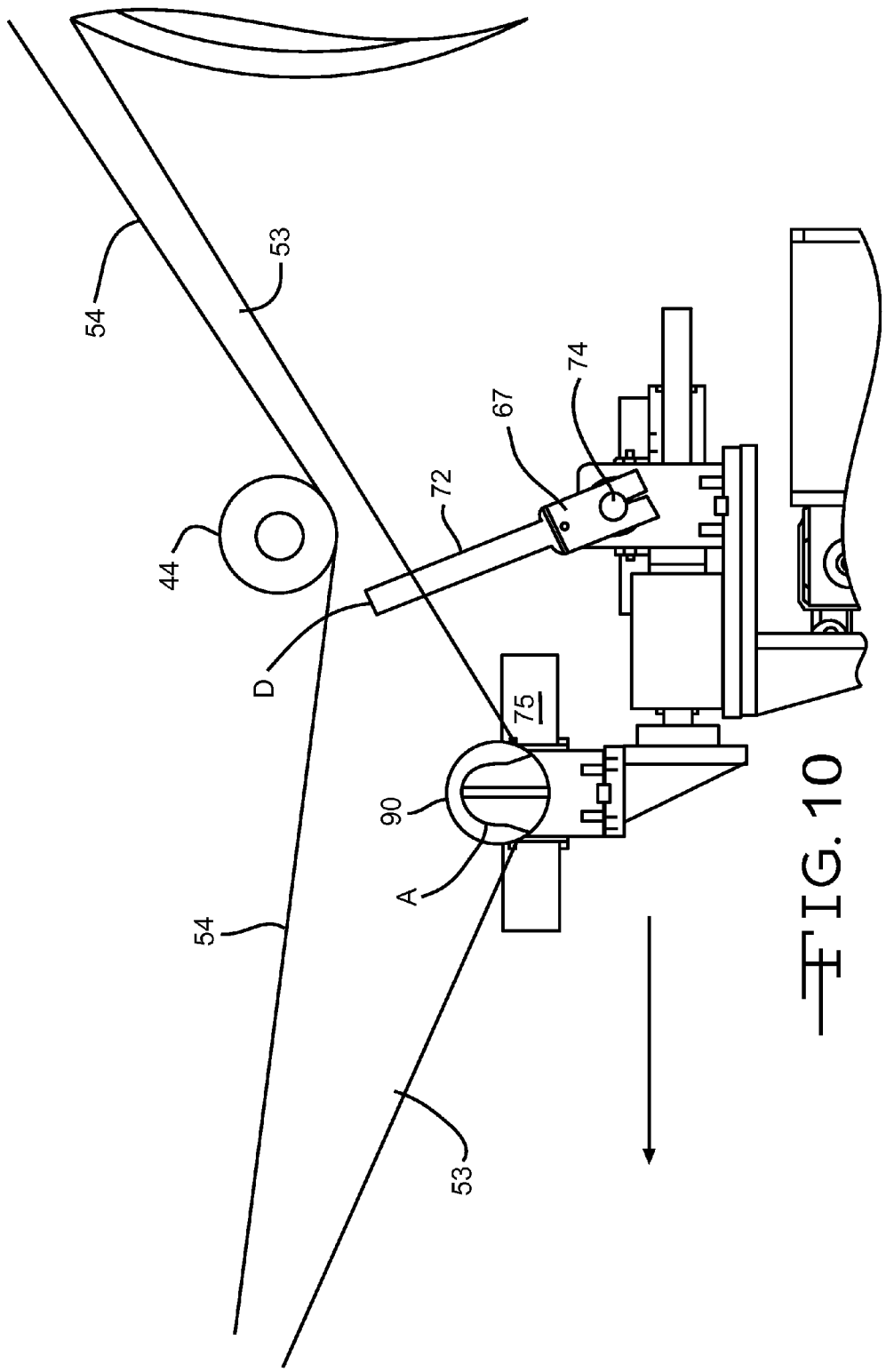
FIGS. 10-13 are partial front views showing positions in sequential steps of using the invention.
Figure 11:
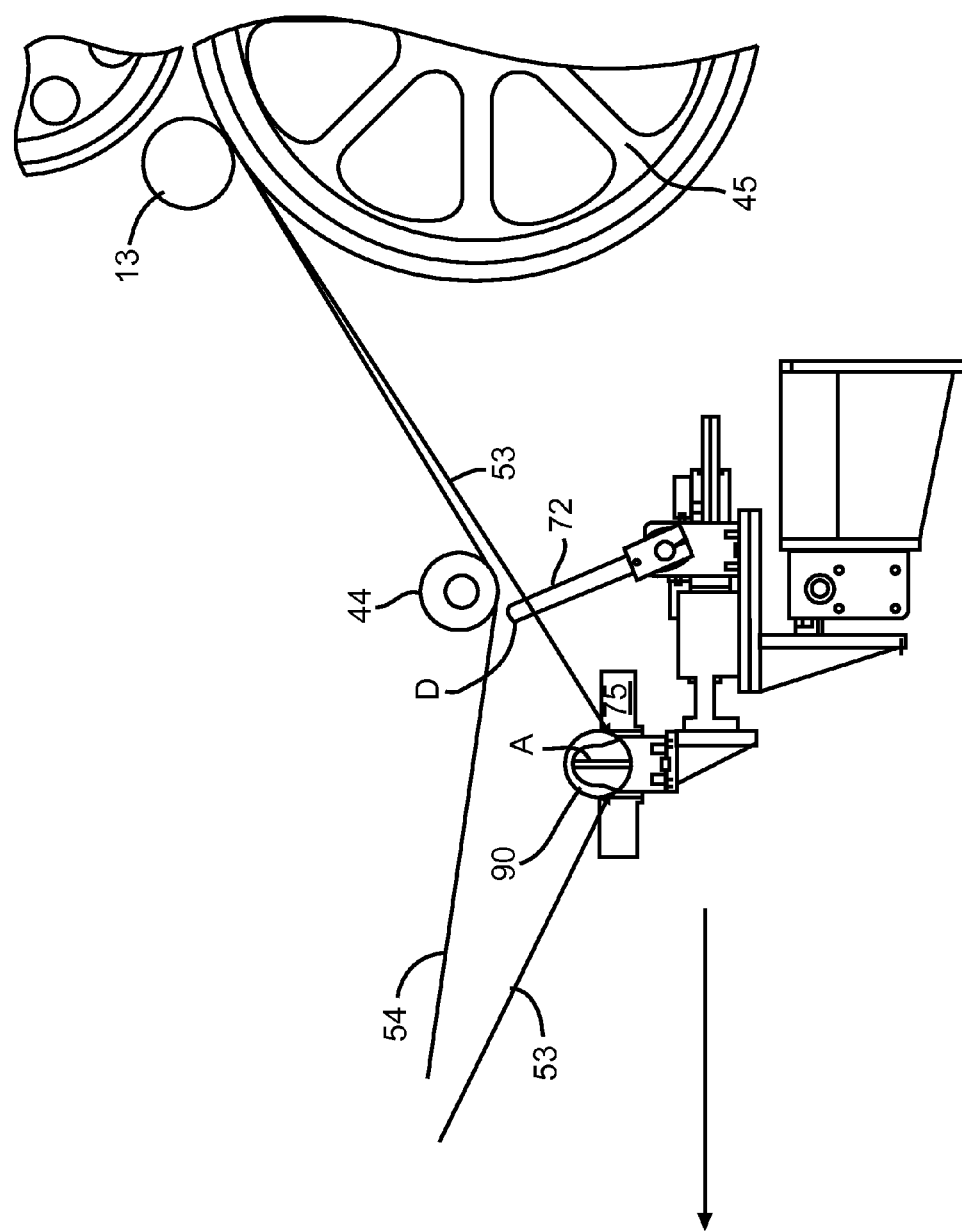
Figure 12:
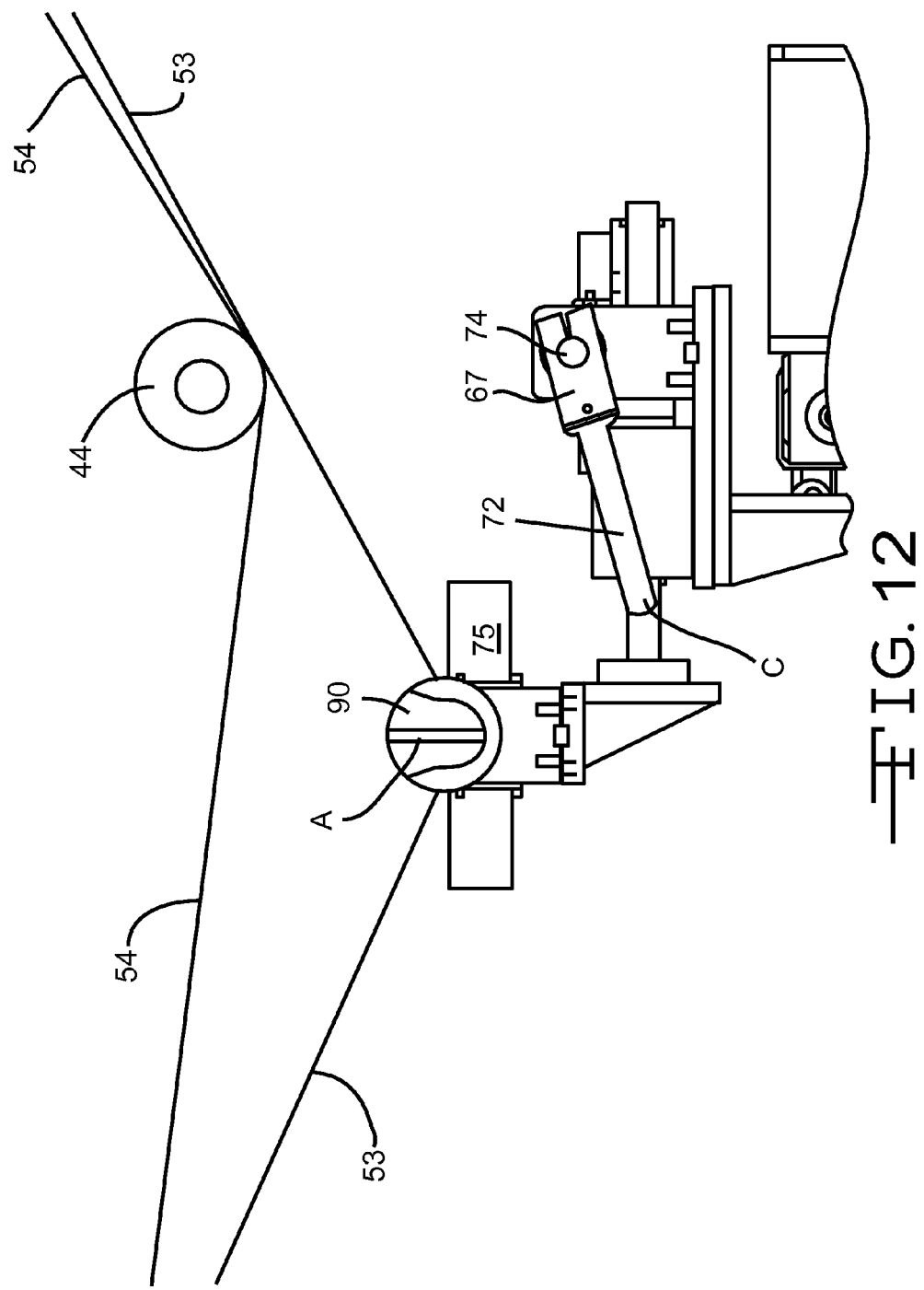
Figure 13:
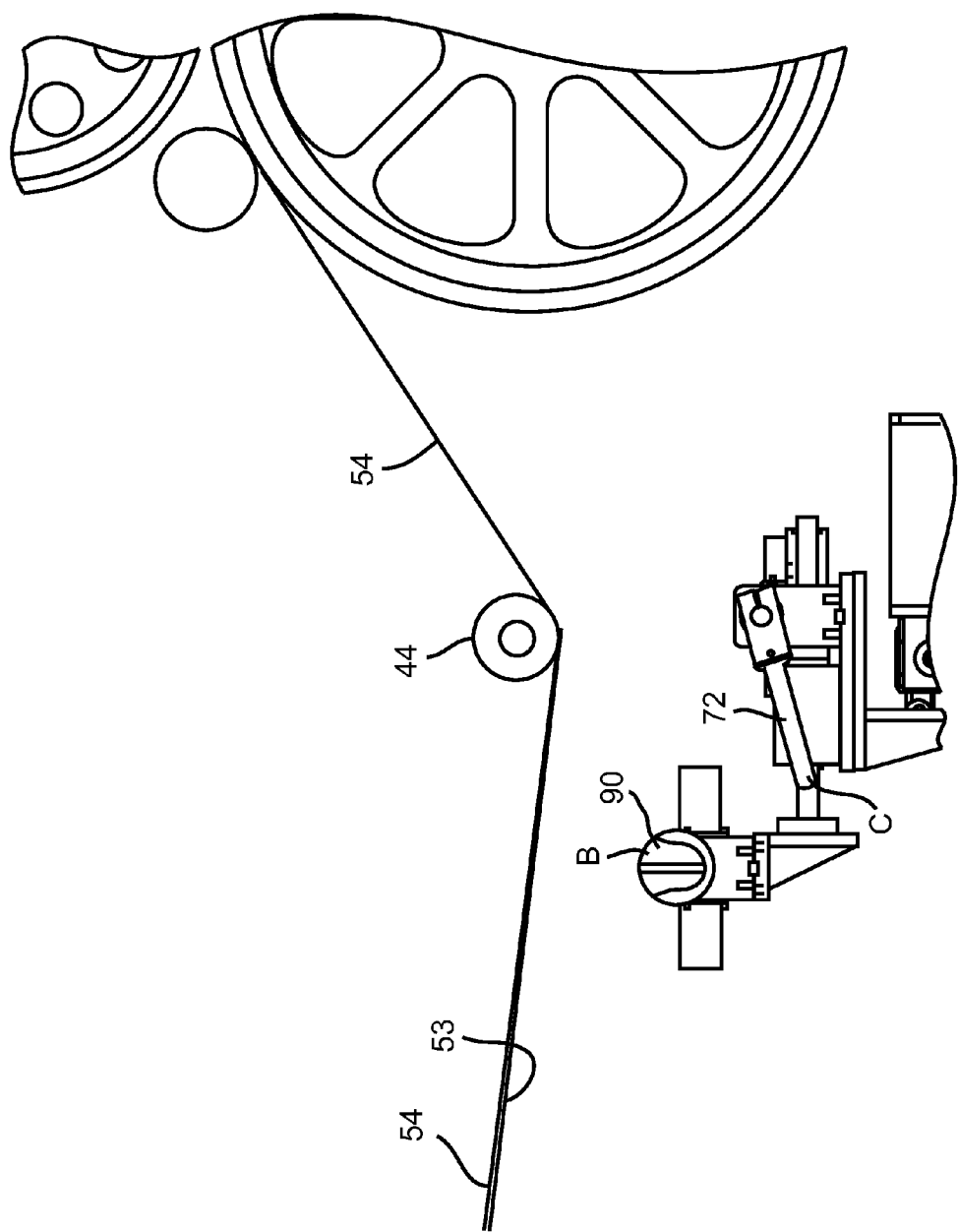

FIG. 10 shows in front view the new fiber(s) 53 position and that of the shoe 90 with respect to the separator roll 44, and that the shoe 90 supporting and constraining the now rapidly running new fiber(s) 53 is ready to, or beginning to move in a horizontal or generally horizontal upstream direction, see the arrow, away from the separator roll 44 and the backup roll 45, with the shoe still in the A position and the finger 72 still in the D position. Movement in that direction will move the path of the new fiber(s) 53 upward towards the desired groove 27 in the separator roll 44, as shown in FIG. 11. FIG. 12 shows in front view after the shoe 90 has been moved with the linear actuator 81 so far upstream that the new fiber(s) are now just below the desired groove 27 in the separator roll and just after the finger has been pivoted down to the C position and with the shoe 90 still supporting and constraining the new fiber(s) 53 with the hooknose 92 and groove 94 in the A position.

Figure 14:
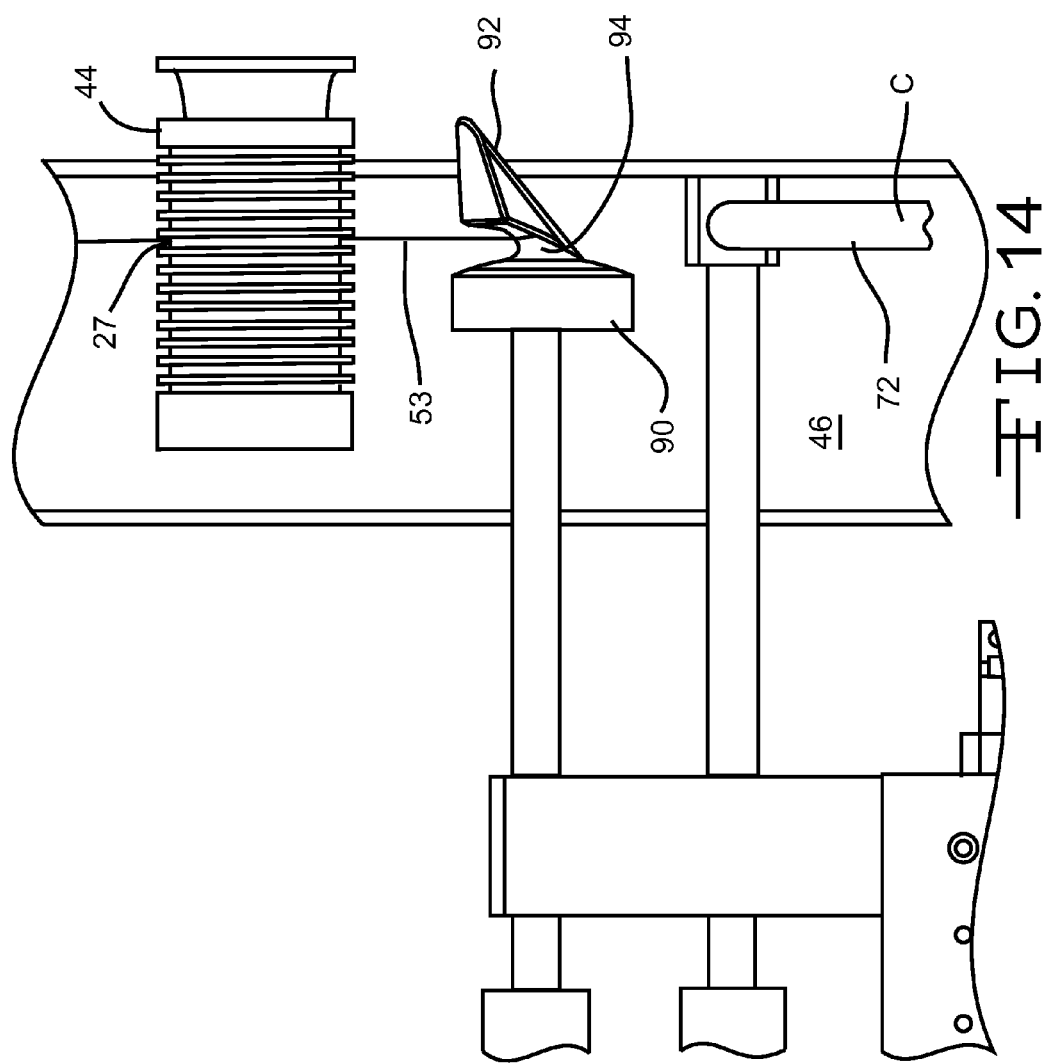
FIGS. 14 and 15 are partial plan views of some sequential steps of using the invention.
Figure 15:
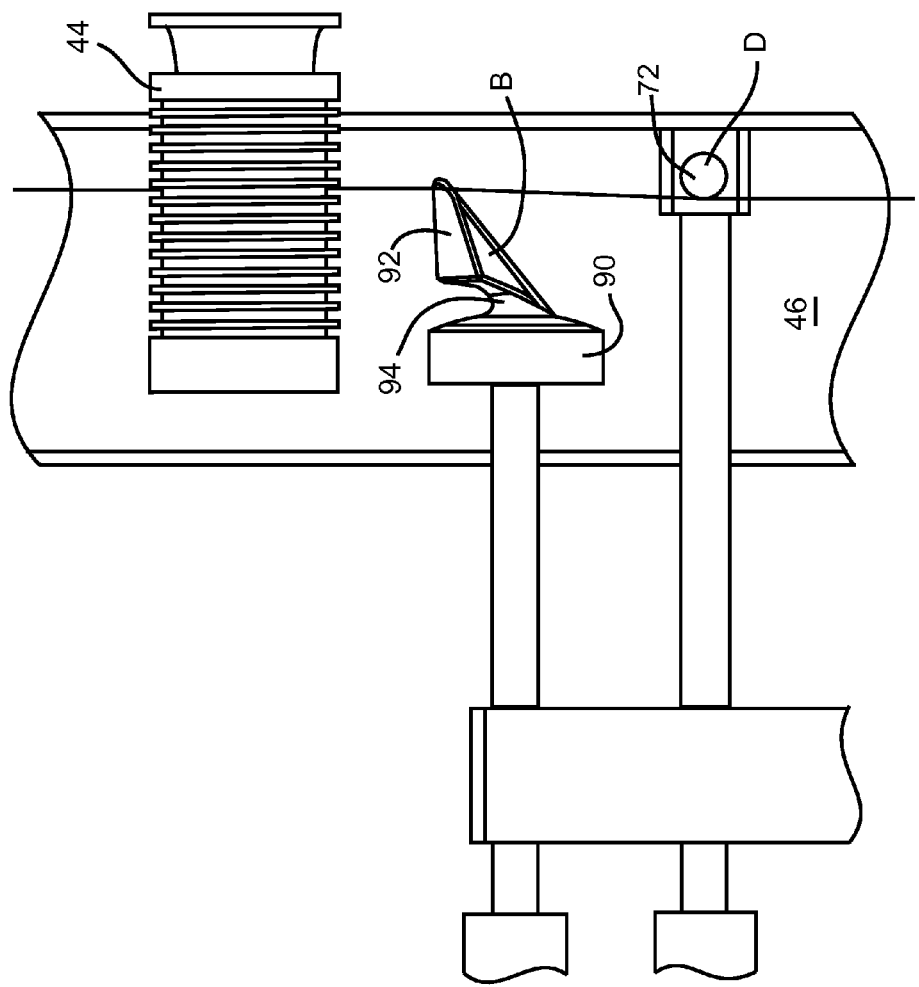

The next step is to stop the linear actuator 80 by stopping the servo motor 81 and then, as shown in the plan view of FIG. 14, and then the rotary actuator 75 is energized by the controller 89 and appropriate valve (not shown) to rotate the show 90 to the B position with the groove 94 in the up orientation, thus releasing the new fiber(s) 53 to move into the desired groove 27 on the separator roll and become running fiber(s) 54. The final step, partially shown in plan view in FIG. 15, is for the controller 89 to activate the linear thruster 76 to move the shoe 90 away from the operator position X, to activate the rotary actuator 75 to rotate the show back to the A position and finally for the controller 89 to activate the servo motor to cause the linear actuator to move the shoe 90 and the finger 72 in a horizontal or generally horizontal direction towards the separator roll 44 and the backup roll 45 to the position shown in front view in FIG. 5 where the fiber(s) manipulator 60 will be in position to start another new fiber(s) 53. The time between steps is controlled by the controller 89 utilizing adjustable timers to permit flexibility for changing conditions. Also, positive physical stops can be used to limit linear and/or rotary movements if so desired.

FIG. 16 is a front view of a system for winding fiber(s) coming from one or more bushings, cakes, roving packages or bobbins. The new fiber(s) manipulator 60 in FIG. 16 is the same as shown in FIGS. 5 and 19-21 and the sequence of operations of the fiber(s) manipulator 60 is the same as described above and shown in FIGS. 5-15 with the following exception. The operator starts the new fiber(s) 53 winding around an outer hub of the mandrel 106 that extends beyond the fiber(s) package 108 towards the operator to accelerate the new fiber(s) to near the running speed of the running fiber(s) 54 and then the new fiber(s) are transferred to join the running fiber(s) 54 by the motions of the shoe 90 and finger 72, the trailing fiber(s) from the hub of the mandrel 106 are cut, either by the operator or by conventional fiber(s) cutting tool (not shown) mounted in a known manner on the winder 101. The operator then removes the waste new fiber(s) 53 from the hub of the mandrel 106 for disposal.

While all of the figures have shown the invention with fiber(s) moving from left to right, the invention is equally applicable to situations in which the fiber(s) move from right to left or vertically or generally vertically. Different embodiments employing the concept and teachings of the invention will be apparent and obvious to those of ordinary skill in this art and these embodiments are likewise intended to be within the scope of the claims. The inventor does not intend to abandon any disclosed inventions that are reasonably disclosed but do not appear to be literally claimed below, but rather intends those embodiments to be included in the broad claims either literally or as equivalents to the embodiments that are literally included.

We claim:

1. An apparatus for supporting and constraining one or more fibers moving slowly at first and then rapidly away from a source of the one or more fibers in a direction of the of a path of the one or more fibers towards an apparatus for manipulating the one or more fibers and a processing machine, the apparatus for manipulating the one or more fibers comprising the elements:
   a) a shoe having a surface, when in a first orientation, for supporting and constraining the one or more fibers, but not supporting or constraining the one or more fibers when said shoe is in a second orientation,
   b) a pivoting finger guide for guiding and pushing the one or more fibers generally perpendicularly to their moving direction of movement along said path,
   c) a first rotary actuator for moving the shoe between the first and the second orientations and between the second and the first orientations,
   d) a second rotary actuator for pivoting the finger guide,
   e) a first mechanism for moving the shoe and the finger guide forward and backward in directions generally perpendicular to said path of the moving one or more fibers,
   f) a second mechanism for moving the shoe backwards and forwards in directions parallel to said path of the one or more moving fibers,
   g) a frame for positioning and supporting elements a-e of the apparatus, and
   h) a controller for controlling the movable elements of the apparatus.

2. The apparatus of claim 1 wherein the manipulator for the one or more fibers functions in cooperation with a separator roll having a plurality of spaced apart grooves for the one or more running fibers.

3. The apparatus of claim 2 wherein the first and second orientations of the shoe are obtained by rotating the shoe clockwise or counter-clockwise.

4. The apparatus of claim 2 wherein the shoe is a composite material.

5. The apparatus of claim 4 wherein the finger is a rod.

6. The apparatus of claim 2 wherein the finger is a rod.

7. The apparatus of claim 2 wherein said manipulator also functions in cooperation with a chopper for separating the one or more fibers into short lengths.

8. The apparatus of claim 7 wherein the first and second orientations of the shoe are obtained by rotating the shoe clockwise or counter-clockwise.

9. The apparatus of claim 2 wherein said manipulator also functions in cooperation with a winder for winding the one or more fibers into a cake, a roving package or onto a bobbin.

10. The apparatus of claim 9 wherein the first and second orientations of the shoe are obtained by rotating the shoe clockwise or counter-clockwise.

11. The apparatus of claim 1 wherein the first and second orientations of the shoe are obtained by rotating the shoe clockwise or counter-clockwise.

12. The apparatus of claim 1 wherein the shoe is a composite material.

13. The apparatus of claim 12 wherein the finger is a rod.

14. T apparatus of claim 1 wherein the finger is a rod.

15. A system for manipulating one or more fibers and for processing the one or more fibers in a machine for chopping said one or more fibers into short lengths or for winding said one or more fibers into cakes, packages or bobbins of wound fiber or fibers, the system comprising;
a) a source of one or more fibers,
b) said one or more fiber, moving away from the source slowly at first and then rapidly away from the source in a direction along a path towards a manipulator for said one or more fibers and also towards either the chopper or the winder, the manipulator comprising;
c) a shoe on the manipulator, the shoe having a supporting and constraining surface for the one or more fibers in a first orientation of the shoe, but not supporting or constraining the one or more fibers when said shoe is in a second orientation,
d) a pivoting finger guide on the manipulator for guiding and pushing the one or more fibers generally perpendicularly to said path,
e) a first rotary actuator on the manipulator for moving the shoe between the first and the second orientations and between the second and the first orientations,
f) a second rotary actuator on the manipulator for pivoting the finger guide,
g) a first mechanism on the manipulator for moving the shoe and the finger guide forward and backward in directions generally perpendicular to said path of the one or more moving fibers,
h) a second mechanism on the manipulator for moving the shoe backwards and forwards parallel to said path of the one or more moving fibers,
i) a frame of the manipulator for supporting elements a-e of the system, and
j) a controller for controlling the movable elements of the manipulator.

16. The system of claim 15 wherein the processing machine is a chopper.

17. The system of claim 16 wherein the one or more fibers comprise one or more wet, sized glass fibers or one or more strands comprised of such fibers.

18. The system of claim 15 wherein the one or more fibers comprise one or more wet, sized glass fibers or one or more strands comprised of such fibers.

* * * * *